US010284953B2

(12) United States Patent
Hammer et al.

(10) Patent No.: US 10,284,953 B2
(45) Date of Patent: May 7, 2019

(54) MAINTAINING GROUPING INFORMATION FOR AUDIO SPEAKERS DEVICES

(71) Applicant: PWV Inc, Bellevue, WA (US)

(72) Inventors: Jeremy Adam Hammer, Kirkland, WA (US); James Andrew Hammer, Kirkland, WA (US)

(73) Assignee: PWV INC., Bellevue, WA (US)

( * ) Notice: Subject to any disclaimer, the term of this patent is extended or adjusted under 35 U.S.C. 154(b) by 0 days.

(21) Appl. No.: 15/641,149

(22) Filed: Jul. 3, 2017

(65) Prior Publication Data

US 2017/0303042 A1    Oct. 19, 2017

Related U.S. Application Data

(63) Continuation of application No. 14/988,736, filed on Jan. 5, 2016, now Pat. No. 9,699,559.

(60) Provisional application No. 62/099,955, filed on Jan. 5, 2015, provisional application No. 62/099,957, filed on Jan. 5, 2015.

(51) Int. Cl.
*H04R 3/12*    (2006.01)
*H04J 3/06*    (2006.01)

(52) U.S. Cl.
CPC .................. *H04R 3/12* (2013.01); *H04J 3/06* (2013.01); *H04J 3/0661* (2013.01); *H04R 2420/05* (2013.01); *H04R 2420/07* (2013.01)

(58) Field of Classification Search
CPC .. H04R 2420/07; H04R 3/12; H04R 2420/05; H04J 3/06; H04J 3/0661
USPC .............................................. 381/79, 58, 59
See application file for complete search history.

(56) References Cited

U.S. PATENT DOCUMENTS

| | | | |
|---|---|---|---|
| 7,768,981 | B1 | 8/2010 | Donovan et al. |
| 7,805,210 | B2 | 9/2010 | Cucos et al. |
| 7,983,615 | B2 | 7/2011 | Bryce et al. |
| 8,423,893 | B2 | 4/2013 | Ramsay et al. |
| 8,432,260 | B2 | 4/2013 | Talty et al. |
| 8,838,262 | B2 | 9/2014 | Mehta et al. |
| 9,699,559 | B2 | 7/2017 | Hammer et al. |
| 10,158,946 | B2 | 12/2018 | Hammer et al. |
| 2005/0031129 | A1 | 2/2005 | Davantier et al. |
| 2008/0242222 | A1 | 10/2008 | Bryce et al. |

(Continued)

FOREIGN PATENT DOCUMENTS

| | | |
|---|---|---|
| WO | 2016037155 A1 | 3/2016 |
| WO | 2016112048 A1 | 7/2016 |

OTHER PUBLICATIONS

European Application No. 16735322.6 "Supplementary European Search Report" dated Jun. 12, 2018, 18 pages.

(Continued)

*Primary Examiner* — Paul Kim
(74) *Attorney, Agent, or Firm* — Merchant & Gould

(57) ABSTRACT

Described herein are systems, devices, and methods for generating a synchronized time value for a wireless speaker having a first timer and a second timer. In some embodiments, the systems, devices, and method may include reading a first timer value associated with the first timer, wherein the first timer is synchronized with a wireless network. Further, a first timer value associated with the second timer may be read. The first timer value associated with the second timer may be correlated to the first timer value associated with the first timer to generate the synchronized time value for the wireless speaker.

20 Claims, 24 Drawing Sheets

(56) References Cited

U.S. PATENT DOCUMENTS

| | | |
|---|---|---|
| 2008/0253575 A1 | 10/2008 | Lorgeoux et al. |
| 2009/0193472 A1 | 7/2009 | Braithwaite et al. |
| 2009/0298420 A1 | 12/2009 | Haartsen et al. |
| 2010/0172512 A1 | 7/2010 | Braithwaite et al. |
| 2010/0284389 A1 | 11/2010 | Ramsay et al. |
| 2010/0292818 A1 | 11/2010 | Ramsay |
| 2010/0293264 A1 | 11/2010 | Ramsay |
| 2010/0299639 A1* | 11/2010 | Ramsay ............... G06F 3/0486 715/835 |
| 2011/0044468 A1 | 2/2011 | Braithwaite et al. |
| 2012/0300944 A1 | 11/2012 | Spittle |
| 2013/0343365 A1 | 12/2013 | Hollabaugh et al. |
| 2014/0064492 A1 | 3/2014 | Lakkundi et al. |
| 2014/0328506 A1 | 11/2014 | Banks et al. |
| 2015/0195651 A1 | 7/2015 | Boehlke |
| 2015/0208187 A1 | 7/2015 | Carlsson et al. |
| 2015/0208188 A1 | 7/2015 | Carlsson et al. |
| 2015/0215723 A1 | 7/2015 | Carlsson et al. |
| 2016/0014513 A1 | 1/2016 | McCoy et al. |
| 2016/0073197 A1 | 3/2016 | Hammer et al. |

OTHER PUBLICATIONS

International Patent Application PCT/US2016/12240 "International Search Report and Written Opinion" dated Apr. 1, 2016, 9 pages.
International Patent Application PCT/US2016/12240 "International Preliminary Report on Patentability" dated Jul. 11, 2017, 7 pages.
U.S. Appl. No. 14/846,727 "Non-Final Office Action" dated Nov. 22, 2016, 11 pages.
U.S. Appl. No. 14/846,727 "Non-Final Office Action" dated Sep. 5, 2017, 12 pages.
U.S. Appl. No. 14/846,727 "Notice of Allowance" dated Jul. 17, 2018, 12 pages.
International Patent Application PCT/US2015/048730 "International Search Report and Written Opinion" dated Jan. 6, 2016, 8 pages.
International Patent Application PCT/US2015/048730 "International Preliminary Report on Patentability" dated Mar. 7, 2017, 7 pages.

* cited by examiner

MAINTAINING GROUPING INFORMATION FOR AUDIO SPEAKERS DEVICES

CROSS-REFERENCE TO RELATED APPLICATIONS

This application is a continuation of U.S. patent application Ser. No. 14/988,736, filed Jan. 5, 2016, now U.S. Pat. No. 9,699,559, issued Jul. 4, 2019, which claims the benefit of U.S. Provisional Patent Application Ser. No. 62/099,955, now expired, filed Jan. 5, 2015 and U.S. Provisional Patent Application Ser. No. 62/099,957, now expired, filed Jan. 5, 2015, the entire disclosures of which are hereby incorporated herein by reference for all that they teach and for all purposes.

FIELD OF THE INVENTION

The present invention is generally directed toward wireless speaker discovery, configuration, connection, and the playback process.

BACKGROUND

When designing connection and pairing protocols, usability and security are top concerns. However, there tends to be a general lack of simplicity when it comes to setting up and configuring home theatre systems. In the ecosystem of home theatre systems for example, a more enjoyable experience will be had by the user when the amount of effort required by the user during a configuration process is minimal. In addition, installing, running, and configuring speaker wires for use in home theatre systems may present a challenge for the user and may be a primary reason most users do not have a home theatre system. However, designing a system that requires minimal effort on the part of the user, is highly secure and usable, and is easy to install and configure is often difficult and costly.

SUMMARY

It is, therefore, one aspect of the present disclosure to provide a system and method used to connect wireless speakers to a host device and allow the user to discover, configure, and use the speakers. Such a system and method maintains a level of security while enhancing usability and overall user experience. Moreover, such a system provides audio content to one or more wireless speakers such that the audio content is synchronized between the one or more speakers.

In accordance with embodiments of the present disclosure, a method for generating a synchronized time value for a wireless speaker having a first timer and a second timer is provided. The method may include reading a first timer value associated with the first timer, wherein the first timer is synchronized with a wireless network, reading a first timer value associated with the second timer, and correlating the first timer value associated with the second timer to the first timer value associated with the first timer to generate the synchronized time value for the wireless speaker.

In accordance with another embodiment of the present disclosure, a speaker is provided. The speaker may include a first timer, a second timer, one or more processors, and memory, wherein the memory contains one or more processor-executable instructions that when executed, cause the one or more processors to read a first timer value associated with a first timer, wherein the first timer is synchronized with a wireless network, read a first timer value associated with a second timer, and correlate the first timer value associated with the second timer to the first timer value associated with the first timer to generate a synchronized time value for the wireless speaker.

In accordance with another embodiment of the present disclosure, a speaker is provided. The speaker may include a speaker driver, one or more circuits configured to provide an audio signal to the speaker driver, an internal power supply including: a charge storage device configured to supply power to the one or more circuits, and a first charging coil configured to receive power from an electromagnetic field and charge the charge storage device, and a housing enclosing at least a portion of the speaker driver, the one or more circuits, and the charge storage device.

In accordance with another embodiment of the present disclosure, a system is provided. The system may include a speaker driver, one or more circuits configured to provide an audio signal to the speaker driver, an internal power supply including: a charge storage device configured to supply power to the one or more circuits, and a first charging coil configured to receive power from an electromagnetic field and charge the charge storage device, a housing enclosing at least a portion of the speaker driver, the one or more circuits, and the charge storage device, and second charging coil located external to enclosure and being configured to provide power to the first charging coil.

In accordance with another embodiment of the present disclosure, a method for maintaining speaker group information at a host device having a processor and memory is provided. The method may include receiving a speaker group identifier from a first speaker, wherein the speaker group identifier identifies a speaker group having one or more speakers, and storing the speaker group identifier within the memory.

In accordance with another embodiment of the present disclosure, a method for maintaining speaker group information at a first speaker having a processor and memory is provided. The method may include receiving a first speaker group identifier from a first host device, wherein the first speaker group identifier identifies a speaker group having one or more speakers, and storing the first speaker group identifier within the memory.

The Summary is neither intended nor should it be construed as being representative of the full extent and scope of the present invention. The present invention is set forth in various levels of detail in the Summary, the attached drawings, and in the detailed description of the invention, and no limitation as to the scope of the present invention is intended by either the inclusion or non-inclusion of elements, components, etc. in the Summary. Additional aspects of the present invention will become more readily apparent from the detailed description, particularly when taken together with the drawings.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including, but not limited to, non-volatile media, volatile media, and transmission media. Non-volatile media includes, for example, NVRAM or magnetic or optical disks. Volatile media includes dynamic memory, such as main memory. Common forms of computer-readable media include, for example, a floppy disk, a flexible disk, hard disk, solid-state drive (SSD), magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine," "calculate," and "compute," and variations thereof, as used herein, are used interchangeably and include any type of methodology, process, mathematical operation or technique.

The term "module" as used herein refers to any known or later-developed hardware, software, firmware, artificial intelligence, fuzzy logic, or combination of hardware and software that is capable of performing the functionality associated with that element. Also, while the invention is described in terms of exemplary embodiments, it should be appreciated that an individual aspect of the invention can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
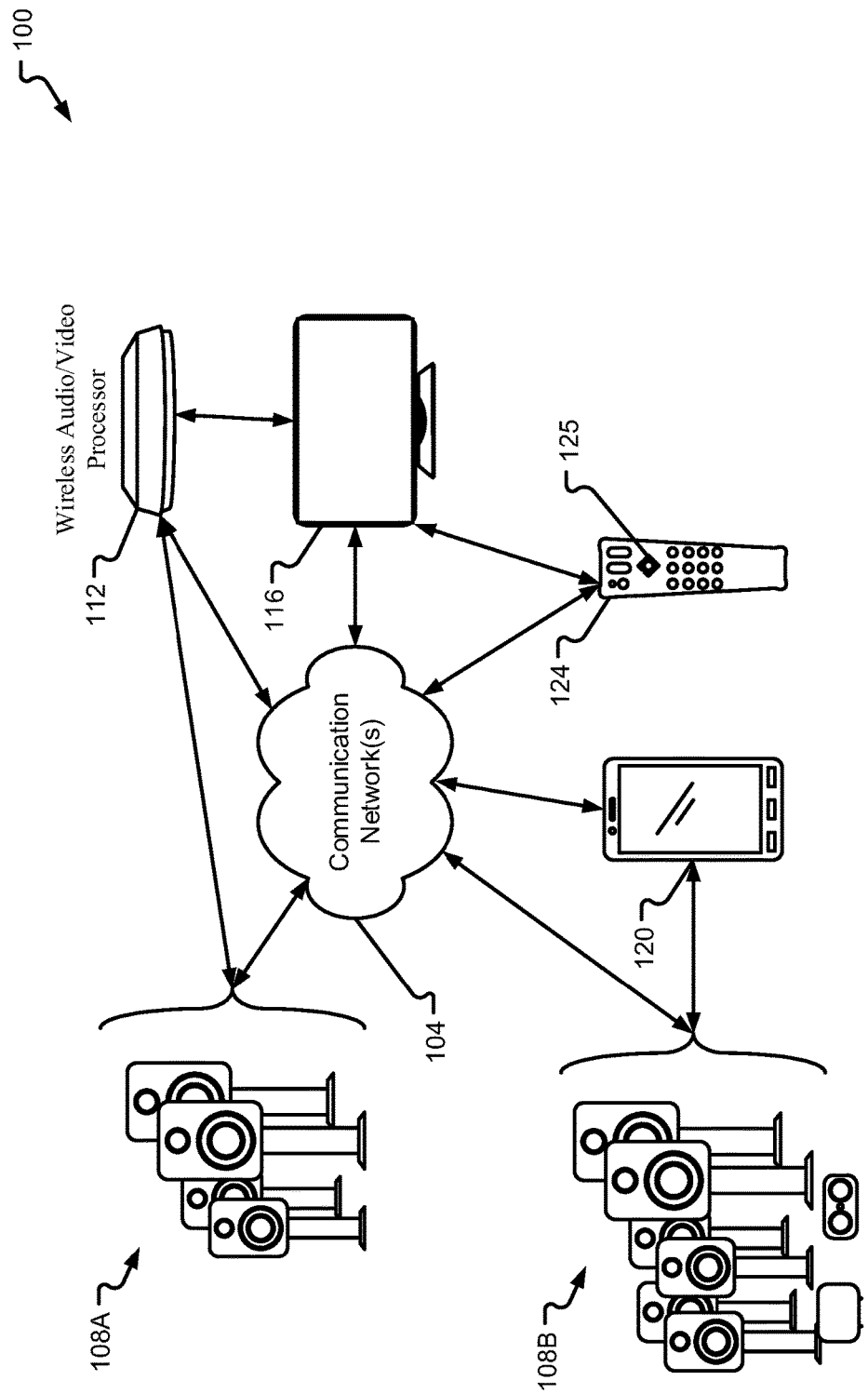
FIG. 1 depicts a wireless audio/video distribution system in accordance with at least some embodiments of the present disclosure.

Referring initially to FIG. 1, details of a wireless audio/video distribution system 100 are depicted in accordance with at least some embodiments of the present disclosure. The wireless audio/video distribution system 100 generally provides time-synchronized wireless audio to one or more zones, or groups, of wireless audio speakers. The wireless audio/video distribution system 100 may include one or more communication networks 104, one or more speaker groups 108A-108B having one or more speakers, one or more wireless audio/video processors 112, one or more televisions 116, one or more mobile devices 120, and one or more remote controls 124 interacting with or otherwise configuring the wireless audio/video processing unit 112, the television 116, and/or the one or more speaker groups 108A-108B.

The one or more communication networks 104 may comprise any type of known communication medium or collection of communication media and may use any type of known protocols to transport messages between endpoints. The communication network 104 is generally a wireless communication network employing one or more wireless communication technologies; however, the communication network 104 may include one or more wired components and may implement one or more wired communication technologies. The Internet is an example of the communication network that constitutes an Internet Protocol (IP) network consisting of many computers, computing networks, and other communication devices located all over the world, which are connected through many networked systems and other means. Other examples of components that may be utilized within the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. The communication network 104 may further comprise, without limitation, one or more Bluetooth networks implementing one or more current or future Bluetooth standards, one or more device-to-device Bluetooth connections implementing one or more current or future Bluetooth standards, wireless local area networks implementing one or more 802.11 standards, such as and not limited to 802.11a, 802.11b, 802.11c, 802.11g, 802.11n, 802.11ac, 802.11as, and 802.11v standards, and/or one or more device-to-device Wi-Fi-direct connections.

Referring again to FIG. 1, the mobile device 120 may be associated with a user and may correspond to any type of known communication equipment or collection of communication equipment operatively associated with at least one communication module and antenna or transceiver. The mobile device 120 may be any device for carrying out functions, instructions, and/or may be utilized to communicate with the wireless audio/video processing unit 112, and/or directly with the one or more speakers and/or speaker groups 108A-108B utilizing communication network 104 and/or a direct connection, via Bluetooth, Wi-Fi Direct, a proprietary direct connection, or otherwise. Examples of a suitable mobile device 120 may include, but are not limited to, a personal computer, laptop, Personal Digital Assistant (PDA), cellular phone, smart phone, tablet, mobile computing device, handheld radio, dedicated mobile device, and/or combinations thereof. In general, the mobile device 120 is capable of providing one or more audio streams to one or more speakers and/or one or more speaker groups 108A-108B. The mobile device 120 may optionally have a user interface to allow a user to interact with the mobile device 120. The user interface may optionally allow a user to make configuration changes to one or more speakers and/or one or more speaker groups 108A-108B directly or indirectly.

Speaker groups 108A-108B may be a collection of one or more speakers capable of receiving, playing, and/or transmitting audio information. The audio information may comprise one or more digital audio streams or one or more multichannel digital audio streams that are received from a variety of connected devices, such as mobile device 120 and/or the wireless audio/video processing unit 112. The audio information may be encrypted, encoded, and/or provided as a protected content stream. In some embodiments, and in accordance with the present disclosure, the digital audio stream may be a Bluetooth Audio stream, which may be compressed utilizing one or more compression CODECs, such as, but not limited to, MPEG. The Bluetooth Audio stream may be sent to a processor or microcontroller within a speaker of the speaker group 108A-108B, where the audio stream may be decoded and separated into a number of discrete individual channels. These channels may include, but are not limited to, Stereo, Stereo with Subwoofer, Dolby or DTS 5.1 Surround Sound, and/or any other multichannel or mono formats. That is, the speaker groups 108A-108B may utilize a varying number of speakers and provide a varying number of configurations with a varying number of channels.

Once the individual channels are extracted and decoded, one of the channels may be played back on the local speaker. Other channels may be sent to any number of other speakers using a standard wireless protocol like Wi-Fi. Each speaker may contain a Bluetooth radio and a Wi-Fi radio for transmitting and receiving the digital audio streams such that each speaker may play back one or more channels of audio. Standard Internet Protocol may be used to assign IP addresses to each speaker for communication purposes and a universally unique identifier (UUID) assigned to each speaker, via the simple service discovery protocol (SSDP), may be used to identify and assign the audio channel each speaker is assigned to or is playing back. A special timing standard, like TSF or 802.1AS, is utilized to adjust and synchronize the audio channel streams to ensure each channel plays back through all speakers at the correct time. Playback of all channels simultaneously achieves the desired spatial effect of stereo or surround sound.

Referring again to FIG. 1, remote control device 124 may be operative to communicate a command to a peripheral device to elicit functionality of the peripheral device. The remote control device 124 is able to store, serve, compute, communicate, and/or display information to enable a user to control one or more peripheral devices, such as the television 116, the wireless audio/video processing unit 112, and/or one or more speakers of the one or more speaker groups 108A-108B. Although remote control device 124 is depicted as a standalone remote control device, such remote control functionality may be provided in and from a mobile device, such as mobile device 120. The remote control device 124 may include one or more navigation buttons 125, such as up, down, left, right, and select/enter buttons.

The wireless audio/video processing unit 112 provides coded and/or decoded audio data, such as, but not limited to, pulse code modulated integrated interchip sound (PCM/I2S) audio data, to one or more speakers of the speaker groups 108A-108B utilizing one or more wireless protocols. That is, the wireless audio/video processing unit 112 does not use a physical connection to the one or more speakers of the speaker groups 108A-108B as a medium for transmitting the wireless audio. Real-Time Transport Protocol (RTP) may be utilized as the streaming protocol. Alternatively, or in addition, a custom header, which contains a sequence number, length, and a 64 bit timestamp, may be utilized to stream the audio. The timestamp may represent the time at which to start sending out the I2S line in the first sample in the packet, in terms of Network Time. As previously mentioned, the audio data may be provided in a PCM format; however, in some embodiments, the audio data may be provided in formats other than PCM. Alternatively, or in addition, the audio data may be provided in both PCM format and formats other than PCM.

Figure 2:
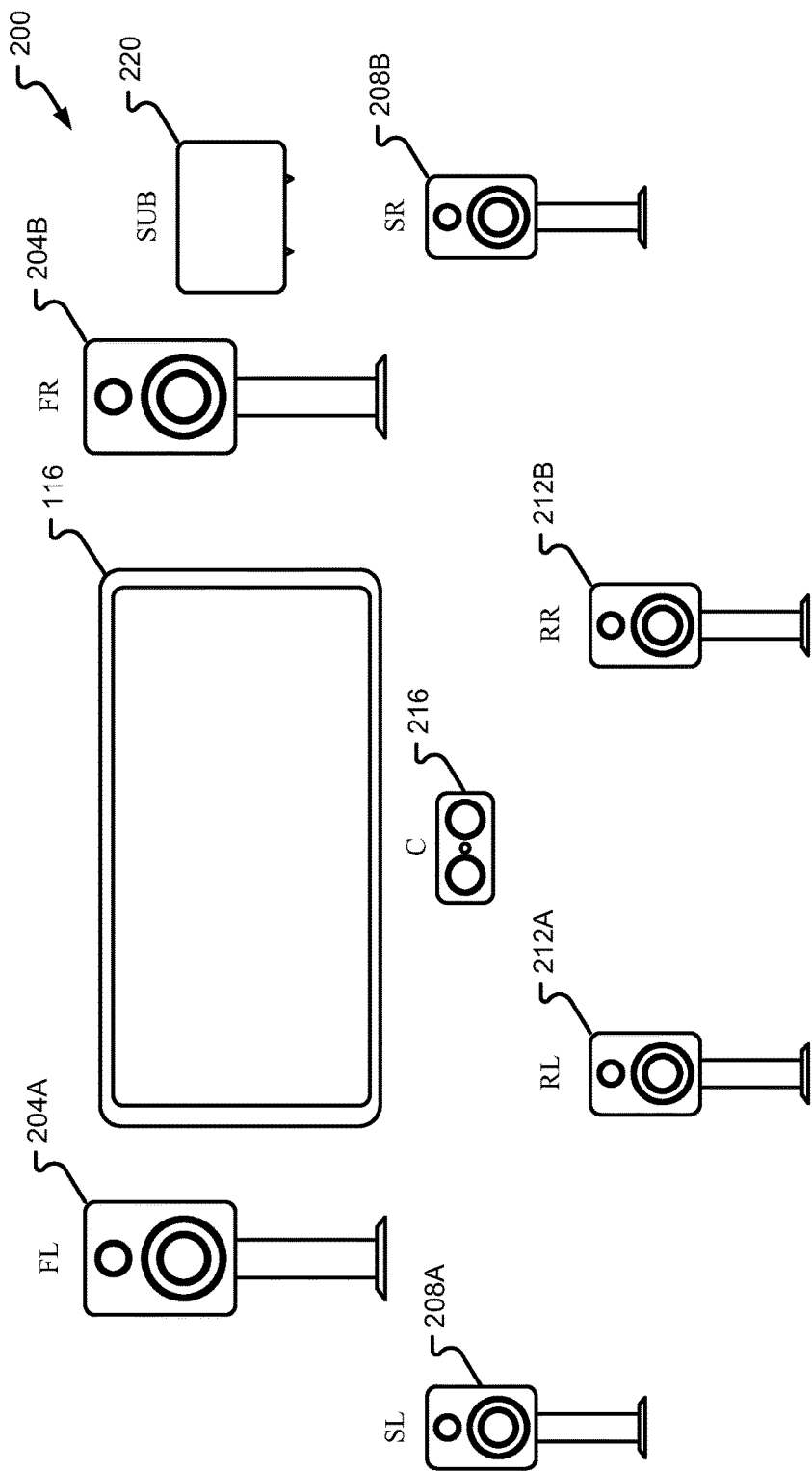
FIG. 2 depicts one or more speaker configurations in accordance with at least some embodiments of the present disclosure.

FIG. 2 illustrates one or more speaker configurations 200 in accordance with embodiments of the present disclosure. That is, speaker groups 108A-108B may utilize a configuration similar to or the same as that which is illustrated in speaker configuration 200. The speaker configuration 200 generally represents a 7.1 surround sound configuration having a front left speaker 204A, a front right speaker 204B, a side left speaker 208A, a side right speaker 208B, a rear left speaker 212A, a rear right speaker 212B, a center speaker 216, and a subwoofer 220. Speaker configuration 200 generally represents an eight-channel surround audio system commonly used in home theatre configurations. Although illustrated as including eight speakers and eight channels, speaker configuration 200 may be of a different surround sound configuration and include more or less than eight speakers and eight channels. Alternatively, or in addition, more than one speaker may be assigned to the same channel. For example, in a 7.2 surround sound configuration, two subwoofers may be utilized to increase, or otherwise enhance, the bass. In some embodiments, one or more speakers and/or one or more channels may be utilized based on an exact location of the speaker. That is, in some circumstances, one or more speakers and one or more corresponding channels may be utilized to provide precise sounds from specific locations to simulate select sounds, such as a helicopter, rain, or other sounds that may or may not include a specific positional component.

Figure 3:
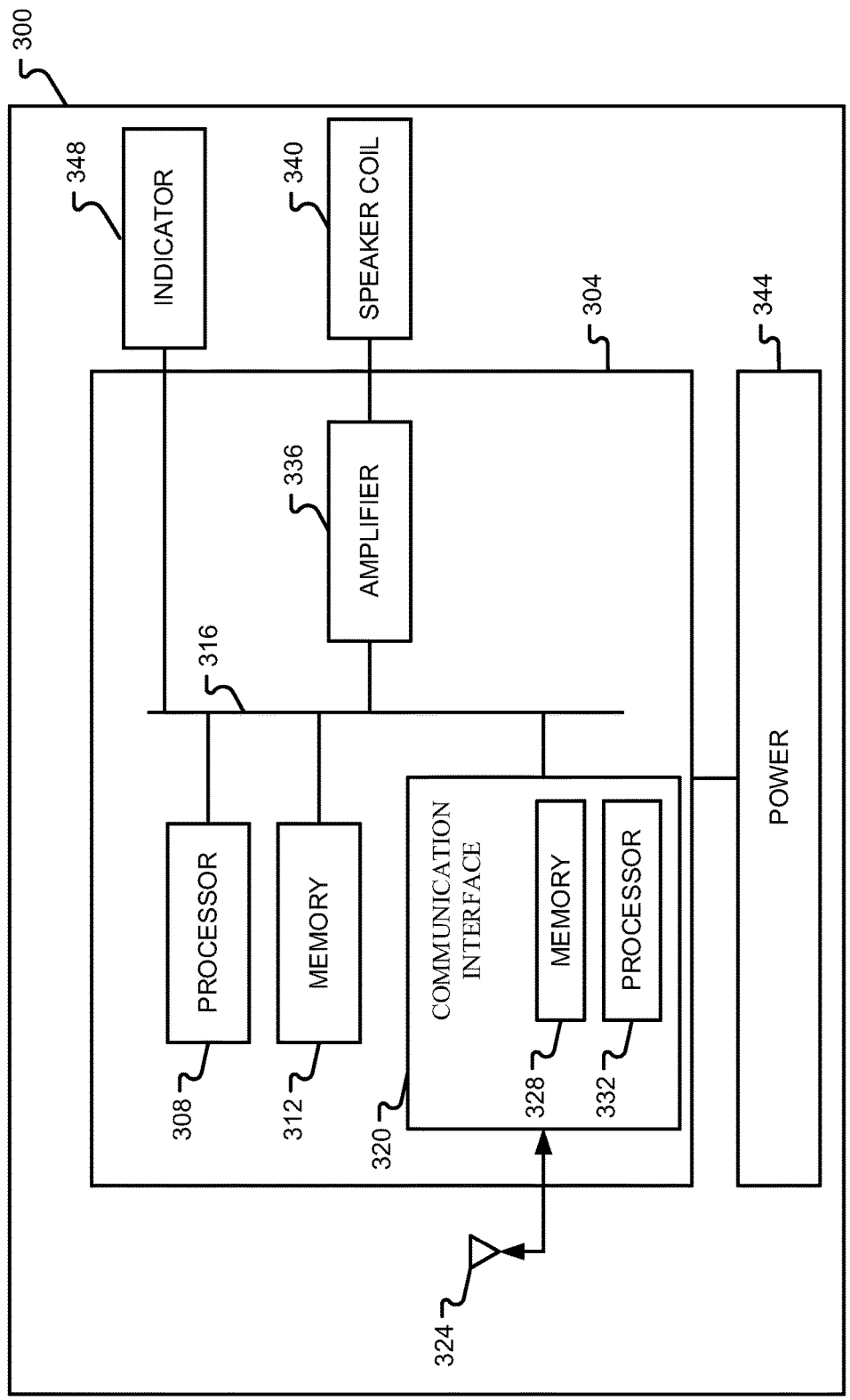
FIG. 3 is a block diagram depicting details of a speaker in accordance with at least some embodiments of the present disclosure.

FIG. 3 illustrates details of one or more speakers 300 in accordance with embodiments of the present disclosure. Speaker 300 may be the same as or similar to one or more speakers illustrated in speaker configuration 200, one or more speakers in speaker groups 108A-108B, and/or one or more speakers referred to throughout the present disclosure. In particular, speaker 300 may include, but is not limited to, speaker electronics 304, which include a processor 308, a memory 312, a communication interface 320, an antenna 324, and an amplifier 336. The speaker 300 may also include one or more mechanical speaker coils 340 and a power source 344. Processor 308 is provided to execute instructions contained within memory 312. Accordingly, the processor 308 may be implemented as any suitable type of microprocessor or similar type of processing chip, such as any general-purpose programmable processor, digital signal processor (DSP), or controller for executing application programming contained within memory 312. Alternatively, or in addition, the processor 308 and memory 312 may be replaced or augmented with an application specific integrated circuit (ASIC), a programmable logic device (PLD), or a field programmable gate array (FPGA).

The memory 312 generally comprises software routines facilitating, in operation, pre-determined functionality of the speaker 300. The memory 312 may be implemented using various types of electronic memory generally including at least one array of non-volatile memory cells (e.g., Erasable Programmable Read Only Memory (EPROM) cells or flash memory cells, etc.) The memory 312 may also include at least one array of Dynamic Random Access Memory (DRAM) cells. The content of the DRAM cells may be pre-programmed and write-protected thereafter, whereas other portions of the memory may selectively be modified or erased. The memory 312 may be used for either permanent data storage or temporary data storage.

The communication interface(s) 320 may be capable of supporting multichannel audio, multimedia, and/or data transfers over a wireless network. Alternatively, or in addition, the communication interface 320 may comprise a Wi-Fi, BLUETOOTH™, WiMAX, infrared, NFC, and/or other wireless communications links. The communication interface 320 may be associated with one or more shared or a dedicated antenna 324. The type of medium used by the speaker 300 to communicate with other speakers 300, mobile communication devices 120, and/or the wireless audio/video processing unit 112 may depend upon the communication application's availability on the speaker 300 and/or the availability of the communication medium.

The communication interface 320 may also include one or more memories 328 and one or more processors 332. The processor 332 may be the same as or similar to that of the processor 308 while memory 328 may be the same as or similar to that of the memory 312. That is, the processor 332 is provided to execute instructions contained within the memory 328. Accordingly, the processor 332 may be implemented as any suitable type of microprocessor or similar type of processing chip, such as any general-purpose programmable processor, digital signal processor (DSP) or controller for executing application programming contained within memory 328. Alternatively, or in addition, the processor 332 and memory 328 may be replaced or augmented with an application specific integrated circuit (ASIC), a programmable logic device (PLD), or a field programmable gate array (FPGA).

The memory 328 generally comprises software routines facilitating, in operation, pre-determined functionality of the communication interface 320. The memory 328 may be implemented using various types of electronic memory generally including at least one array of non-volatile memory cells (e.g., Erasable Programmable Read Only Memory (EPROM) cells or flash memory cells, etc.). The memory 328 may also include at least one array of Dynamic Random Access Memory (DRAM) cells. The content of the DRAM cells may be pre-programmed and write-protected thereafter, whereas other portions of the memory may be selectively modified or erased. The memory 328 may be used for either permanent data storage or temporary data storage. The processor 308, memory 312, communication interface 320, and amplifier 336 may communicate with one another over one or more communication busses or connection 316.

Referring again to FIG. 3, the speaker 300 may include one or more amplifiers 336 that may amplify a signal associated with audio data to be output via one or more speaker coils 340. In some embodiments and consistent with the present disclosure, the speaker 300 may include one or more amplifiers 336, speaker coils 340, and/or speaker assemblies directed to one or more specific frequency ranges. For example, the speaker 300 may include an amplifier 336 and/or speaker coil 340 to output sounds of a low frequency range, an amplifier 336 and/or speaker coil 340 to output sounds of a medium frequency range, and/or an amplifier 336 and/or speaker coil 340 to output sounds of a high frequency range.

Speaker 300 may also include one or more power sources 344 for providing power to the speaker 300 and the components included in speaker 300. The power source 344 may be one of many power sources. Though not illustrated, the speaker 300 may also include one or more locating or location systems. In accordance with embodiments of the present disclosure, the one or more locating systems may provide absolute location information to other components of the wireless audio/video distribution system 100. In some embodiments, a location of the speaker 300 may be determined by the device's location-based features, a location signal, and/or combinations thereof. The location-based features may utilize data from one or more systems to provide speaker location information. For example, a speaker's location may be determined by an acoustical analysis of sound emanating from the speaker in reference to a known location. In some embodiments, sound emanating from the speaker may be received by a microphone. Accordingly, the acoustical analysis of the received sound, with reference to a known location, may allow one or more systems to determine a location of the speaker. The speaker 300 may additionally include an indicator 348, which may be utilized to visually identify the speaker 300 during a speaker assignment process.

In some embodiments, the speaker 300 may implement no management itself. Rather, the association of speakers to groups and their locations may be kept track of by a host device, such as speaker 300, a wireless audio/video processing unit 112, a mobile device 120 and/or combinations thereof. That is, the speaker plays whatever is sent to it and it is up to the host to decide which channel to send to a specific speaker and when the speaker plays back the specific audio channel.

Figure 4:
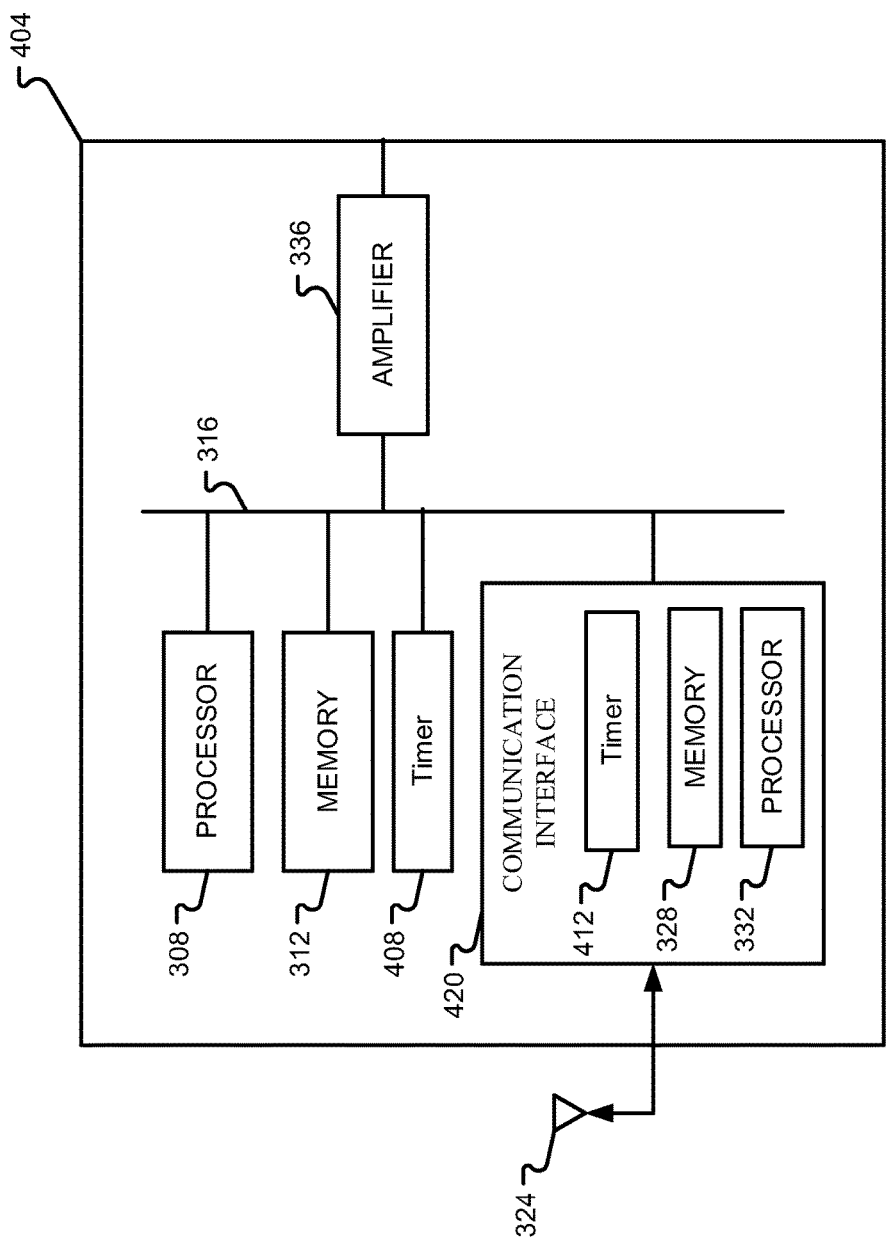
FIG. 4 is a block diagram depicting details of a speaker in accordance with at least some embodiments of the present disclosure.

FIG. 4 provides details of speaker electronics 404 in accordance with embodiments of the present disclosure. That is, speaker electronics 404 may be the same as or similar to the speaker electronics 304. Accordingly, the description of reference characters included in speaker electronics 404 that are the same as those in speaker electronics 304 are therefore omitted.

In accordance with embodiments of the present disclosure, the speaker electronics 404 may include timer 408 and communication interface 420 having a timer 412. Timer 408 and 412 may be utilized to synchronize a network time between one or more speaker groups 108A-108B. That is, existing Wi-Fi technologies for wireless communication may be utilized and enhanced with time synchronization to provide a foundation for synchronizing multichannel audio playback in accordance with embodiments of the present disclosure. More specifically, one or more mechanisms for time synchronization may be utilized. That is, 802.1AS, which utilizes 802.11v TIMINGMSMT, may be utilized for sub-microsecond synchronization. Alternatively, or in addition, the Time Synchronization Function (TSF), which is provided in nearly every Wi-Fi, or communication interface 420, may be utilized. That is, the timer 412 may be utilized in conjunction with the TSF to provide at least one manner of time synchronization.

For example, the communication interface 420 maintains its own local TSF counter, or timer 412, which is synchronized with the Wi-Fi network, such as communication network 104, as specified by 802.11 and required for normal Wi-Fi usage and operation. Accordingly, an API may be utilized, which provides access to, or otherwise requests, the current TSF value within the communication interface 420. When the communication interface 420 receives this request, it reads the value of its TSF counter, or timer 412, and is provided in a reply message to the processor 308 and/or memory 312. At the time the TSF counter, or timer 412, is read (or as close as possible) a general purpose input and/or output (GPIO) associated with the communication interface 420 is toggled. Accordingly, an interrupt may be triggered within the processor 308 at which point the value of the free running timer 408 may be read. Once the reply response message with the actual TSF value is received, the value is correlated to the value of timer 408 using the value read during the interrupt. This procedure is performed periodically, for example every 100 ms, such that instructions utilizing the processor 308 and/or memory 312 may be synchronized.

It should be noted that regardless of whether the TSF or the 802.11v TIMINGMSG is utilized, the mechanism for synchronizing the communication interface 420 and the processor 308 (or instruction executed by the processor 308) may remain the same. That is, the communication interface 420 provides a time and this time is correlated to the time of the processor 308. Further, the time synchronization is utilized such that all speakers agree as to what time it is at any given point. At any time, one may convert between the local time to the network time by the following equation:

network_time_base=(TSF value returned from communication interface 420);

local_time_base=(timer value read during interrupt);

last_network_time_base=(TSF value from the previous request);

last_local_time_base=(timer value from the previous interrupt);

drift_ratio=(network_time_base−last_network_time_base)/(local_time_base−last_local_time_base);

network_time=(local_time+(network_time_base−local_time_base))*drift_ratio;

The conversion from network_time to local_time may be performed by utilizing the algebraic relationship between network_time and local_time to solve for local_time. Again, this allows all of the speakers to agree on what time it is "right now."

Figure 5:
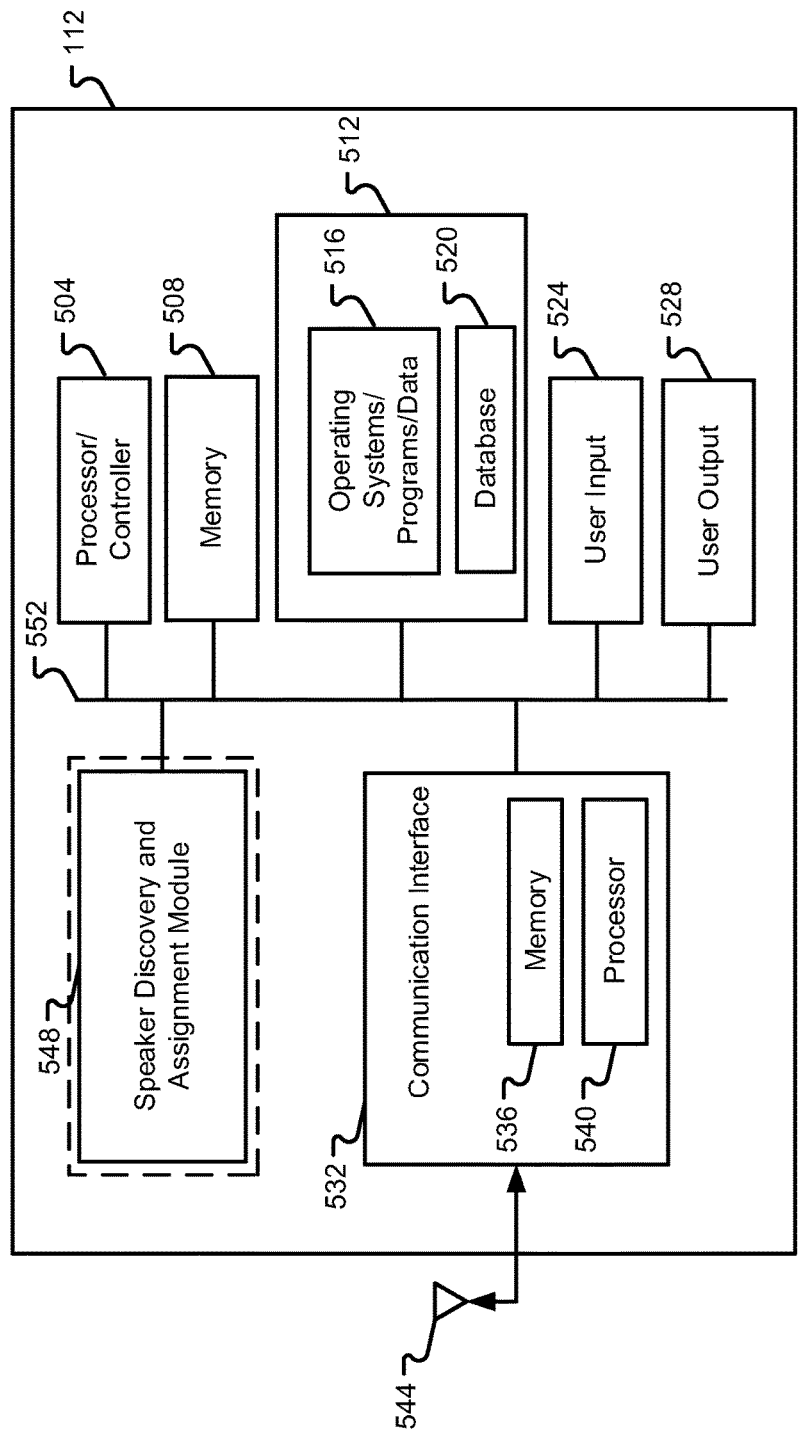
FIG. 5 is a block diagram depicting details of an audio/video processor (AVP) in accordance with at least some embodiments of the present disclosure.

FIG. 5 illustrates a block diagram of one or more wireless audio/video processing unit(s) 112 in accordance with embodiments of the present disclosure. The wireless audio/video processing unit 112 may include a processor/controller 504, memory 508, storage 512, user input 524, user output 528, a communication interface 532, antenna 544, a speaker discovery and assignment module 548, and a system bus 552. The processor/controller 504 may be implemented as any suitable type of microprocessor or similar type of processing chip, such as any general-purpose programmable processor, digital signal processor (DSP) or controller for executing application programming contained within memory 508. Alternatively, or in addition, the processor 504 and memory 508 may be replaced or augmented with an application specific integrated circuit (ASIC), a programmable logic device (PLD), or a field programmable gate array (FPGA).

The memory 508 generally comprises software routines facilitating, in operation, pre-determined functionality of the wireless audio/video processing unit 112. The memory 508 may be implemented using various types of electronic memory generally including at least one array of non-volatile memory cells (e.g., Erasable Programmable Read Only Memory (EPROM) cells or flash memory cells, etc.).

The memory 508 may also include at least one array of Dynamic Random Access Memory (DRAM) cells. The content of the DRAM cells may be pre-programmed and write-protected thereafter, whereas other portions of the memory may be selectively modified or erased. The memory 508 may be used for either permanent data storage or temporary data storage.

Alternatively, or in addition, data storage 512 may be provided. The data storage 512 may generally include storage for programs and data. For instance, with respect to the wireless audio/video processing unit 112, data storage 512 may provide storage for a database 520. Data storage 512 associated with a wireless audio/video processing unit 112 may also provide storage for operating system software, programs, and program data 516.

Similar to the communication interface 320, the communication interface(s) 532 may be capable of supporting multichannel audio, multimedia, and/or data transfers over a wireless network. The communication interface 532 may comprise a Wi-Fi, BLUETOOTH™, WiMAX, infrared, NFC, and/or other wireless communications links. The communication interface 532 may include a processor 540 and memory 536; alternatively, or in addition, the communication interface 532 may share the processor 504 and memory 508 of the wireless audio/video processor 112. The communication interface 532 may be associated with one or more shared or dedicated antennas 544. The communication interface 532 may additionally include one or more multimedia interfaces for receiving multimedia content. As one example, the communication interface 532 may receive multimedia content utilizing one or more multimedia interfaces, such as a high-definition multimedia interface (HDMI), coaxial interface, and/or similar media interfaces. Alternatively, or in addition, the wireless audio/video processing unit 112 may receive multimedia content from one or more devices utilizing the communication network 104, such as, but not limited to, mobile device 120 and/or a multimedia content provider.

In addition, the wireless audio/video processing unit 112 may include one or more user input devices 524, such as a keyboard, a pointing device, and/or a remote control 124. Alternatively, or in addition, the wireless audio/video processing unit 112 may include one or more output devices 528, such as a television 116 and/or a speaker 300. A user input 524 and user output 528 device can comprise a combined device, such as a touch screen display. Moreover, the user input 524 device may generate one or more graphical user interfaces for display on the television 116 or other device while the user output device 528 may receive input from the graphical user interface and/or a combination of the graphical user interface and another input device, such as the remote control 124. Of course, although the wireless audio/video processing unit 112 is described as being wireless, it should be recognized that the audio/video processing unit 112 may require one or more wires for power and/or one or more wires, such as but no limited to an HDMI cable, to provide at least video from the wireless audio/video processing unit 112 to one or more display devices, such as display device 116. In that the wireless audio/video processing unit 112 generally transmits wireless audio to one or more speakers, the wireless audio/video processing unit 112 is considered to be wireless.

Figure 6:
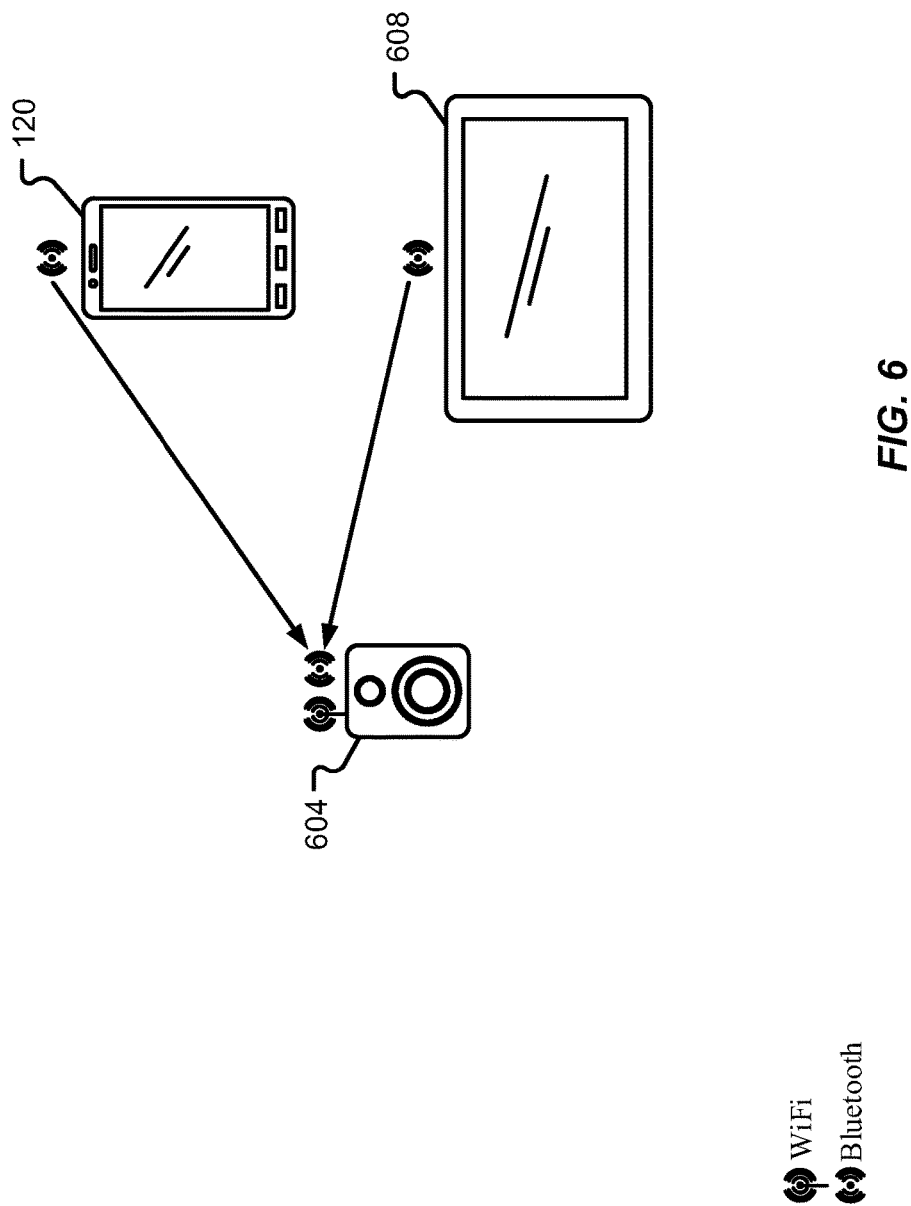
FIG. 6 depicts a first configuration of a wireless audio/video distribution system in accordance with at least some embodiments of the present disclosure.

FIG. 6 provides details of one or more configurations that facilitate a speaker to be used in multiple wireless configurations and in accordance with embodiments of the present disclosure. The ability to operate in many different configurations allows the user to purchase one speaker and use the speaker for many different purposes, saving money and the need to acquire many speakers for different uses. Speakers can also be configured on the fly so a speaker being used for one purpose can be changed to another use as required. The speakers may utilize one or both of Bluetooth™ and Wi-Fi for this purpose. For example, as illustrated in FIG. 6, the speaker 604 uses its Bluetooth radio to receive streamed audio, like those available in MP3 format, from a variety of sources, including mobile devices, such as, but not limited to, mobile devices 120 and/or tablet 608, which stream audio from their libraries or from the Internet, for example. The streamed audio is played back through the speaker's included amplifiers and loudspeakers, such as those described with respect to FIGS. 3 and 4. Alternatively, or in addition, the mobile devices 120 and/or table 608 may communicate with the speaker 604 utilizing the previously described communication network 104 and/or a direct connection, such as Bluetooth™ and/or Wi-Fi direct.

Figure 7:
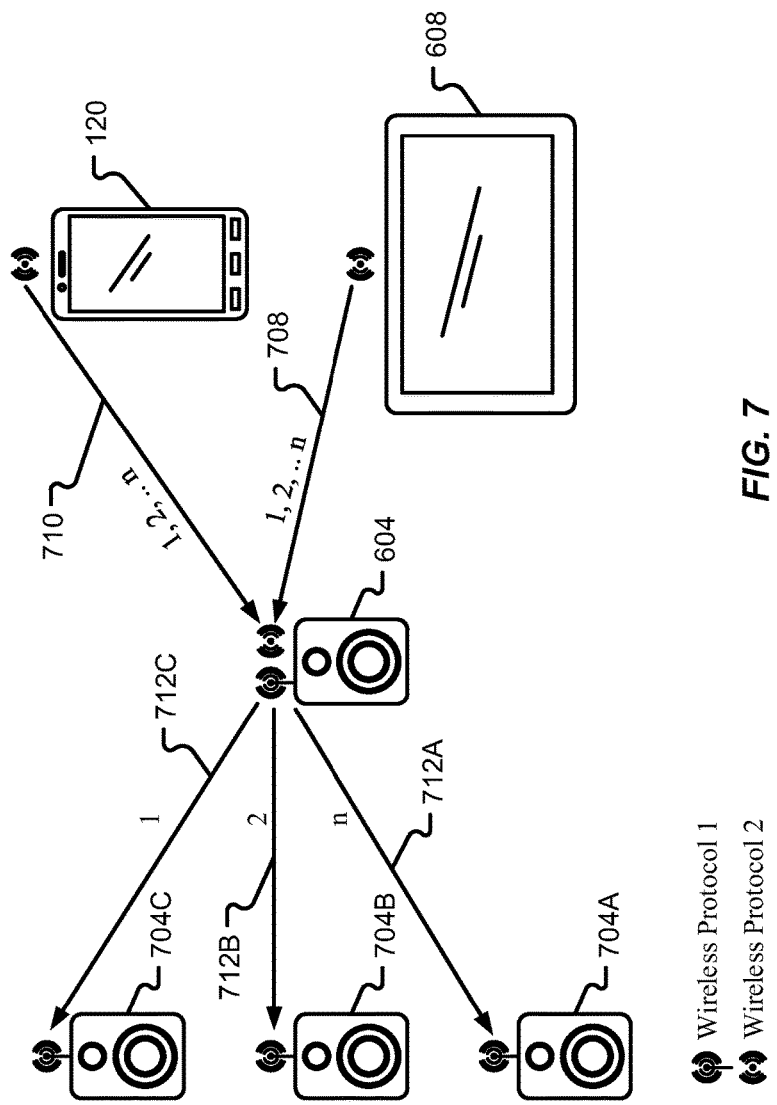
FIG. 7 depicts a second configuration of a wireless audio/video distribution system in accordance with at least some embodiments of the present disclosure.

FIG. 7 provides details of one or more configurations that facilitate a speaker to be used in multiple wireless configurations in accordance with embodiments of the present disclosure. Further, FIG. 7 provides at least one example in which the speakers 604 and/or 704A-704C can also be configured on the fly. For example, as illustrated in FIG. 7, the same speaker 604 may be used to play back multichannel audio from a streamed source like those available in MP3 format, from a variety of sources, including mobile devices, such as mobile device 120 and/or tablet 608, which stream audio from their libraries or from the Internet. A processor or microcontroller, such as processor 308, is used to separate the received streamed audio file into multiple discrete channels, such as and not limited to Stereo, Stereo with Subwoofer, Dolby or DTS 5.1 or 7.1 Surround Sound. Each audio channel may be sent to a different speaker for playback at a specific time using the included Wi-Fi radio to achieve the desired spatial effect of stereo or surround sound. Therefore, by playing all channels simultaneously, the desired spatial effect of stereo or surround sound may be realized.

More specifically, and as illustrated in FIG. 7, a mobile device, such as mobile device 120 and/or tablet 608, may provide a multichannel audio stream for playback in surround mode. The multichannel audio stream 708/710 includes multiple channels of audio represented as 1, 2, . . . n. Processor 308 of speaker 604 may then separate the received audio stream 708/710 into multiple discrete channels 712 and provide the discrete multiple channels 712A-712C to their respective speakers 704A-704C; the timing at which the discrete multiple channels 712A-712C are played at each speaker 604 and 704A-704C is critical. Although FIG. 7 may illustrate an example configuration in which speaker 604 receives the multi-channel audio stream 708/710 via Bluetooth™ (Wireless Protocol 1) and transmits the discrete audio channels 712A-712C via Wi-Fi (Wireless Protocol 2), the exact wireless communication technology, standard, or network may be different. That is, references to Bluetooth™ and Wi-Fi are for illustrative purposes and illustrate at least one configuration; other forms of wireless communication are contemplated. Alternatively, or in addition, the mobile devices 120 and/or tablet 608 may communicate with speakers 604 and 704A-704C, utilizing the previously described communication network 104 and/or a direct connection, such as Bluetooth™ and/or Wi-Fi direct and the speaker 604 communicates with each of the speakers 704A-704C, utilizing the previously described communication network 104 and/or a direct connection, such as Bluetooth™ and/or Wi-Fi direct.

Figure 8:
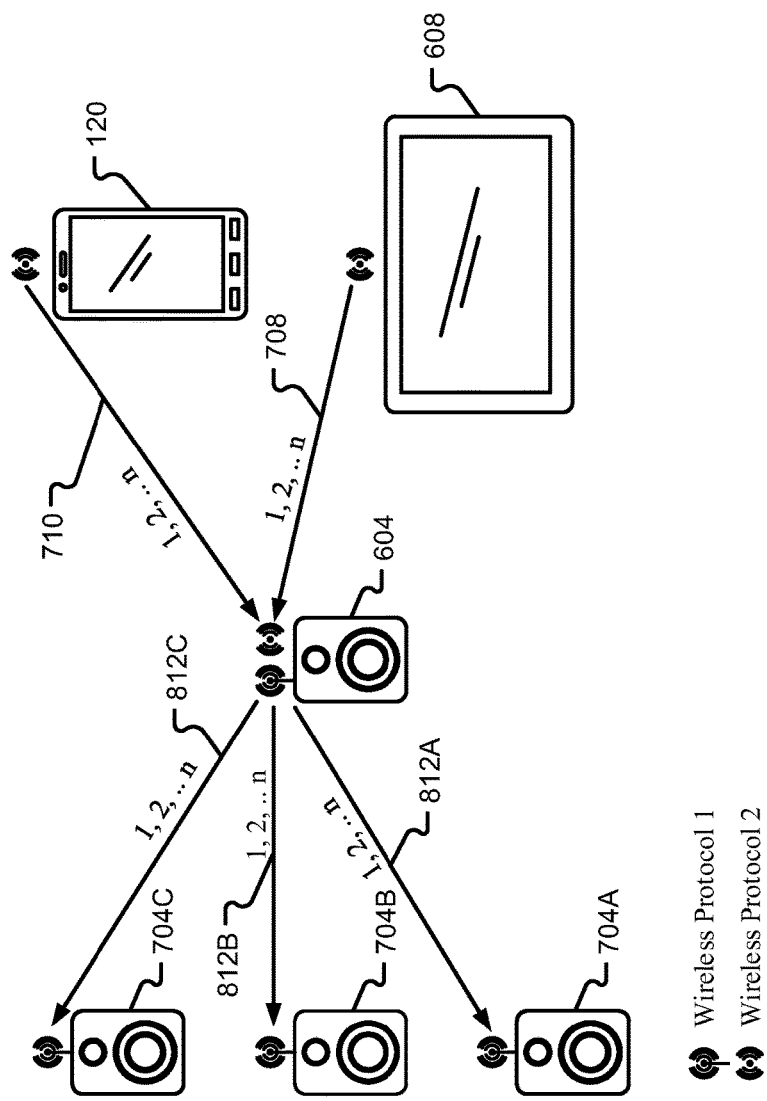
FIG. 8 depicts a third configuration of a wireless audio/video distribution system in accordance with at least some embodiments of the present disclosure.

Alternatively, or in addition, FIG. 8 provides additional details of one or more configurations that facilitate a speaker to be used in multiple wireless configurations in accordance with embodiments of the present disclosure. Further, FIG. 8 provides at least one example in which the speakers 604 and/or 704A-704C can also be configured on the fly. For example, as illustrated in FIG. 8, the same speaker 604 may be used to play back multichannel audio from a streamed source like those available in MP3 format, from a variety of sources, including mobile devices, such as mobile device 120 and/or tablet 608, which stream audio from their libraries or from the Internet. In such a configuration, instead of separating the received streamed audio file into multiple discrete channels, the speaker 604 simply forwards on the received audio stream. Accordingly, each speaker 704A-704C receives the audio stream, and the processor 308 of each speaker 704A-704C may separate, identify, and utilize a specific audio channel according to one or more channel and speaker assignments. By playing all channels simultaneously, with each channel playback time synchronized with the others, the desired spatial effect of stereo or surround sound may be realized. As previously discussed, channel timing is achieved through implementation of TSF or 802.1AS.

More specifically, and as illustrated in FIG. 8, a mobile device, such as mobile device 120 and/or tablet 608, may provide a multichannel audio stream for playback in surround mode. The multichannel audio stream 708/710, includes multiple channels of audio represented as 1, 2, . . . n. Speaker 604 may receive the multichannel audio stream 708/710, identify one or more channels of audio that have been assigned to it, separate the assigned audio channel, and then play the assigned audio channel at a synchronized timing. Speaker 604 may forward or transmit the received multichannel audio stream 708/710 to speakers 704A-704C as multichannel audio streams 812A-812C. Processor 308 of each speaker 704A-704C may then identify, separate, and play one or more channels of the multichannel audio stream that has been assigned to the respective speaker. Accordingly, by playing all channels simultaneously, with each channel playback time synchronized with the others, the desired spatial effect of stereo or surround sound may be realized. Although FIG. 8 may illustrate an example configuration in which speaker 604 receives the multi-channel audio stream 708/710 via Bluetooth™ (Wireless Protocol 1) and transmits the multichannel audio streams 712A-712C via Wi-Fi (Wireless Protocol 2), the exact wireless communication technology, standard, or network may be different. That is, references to Bluetooth™ and Wi-Fi are for illustrative purposes and illustrate at least one configuration; other forms of wireless communication are contemplated. Alternatively, or in addition, the mobile devices 120 and/or tablet 608 may communicate with speakers 604, utilizing the previously described communication network 104 and/or a direct connection, such as Bluetooth™ and/or Wi-Fi direct, and the speaker 604 communicates with each of the speakers 704A-C, utilizing the previously described communication network 104 and/or a direct connection, such as Bluetooth™ and/or Wi-Fi direct.

Figure 9:
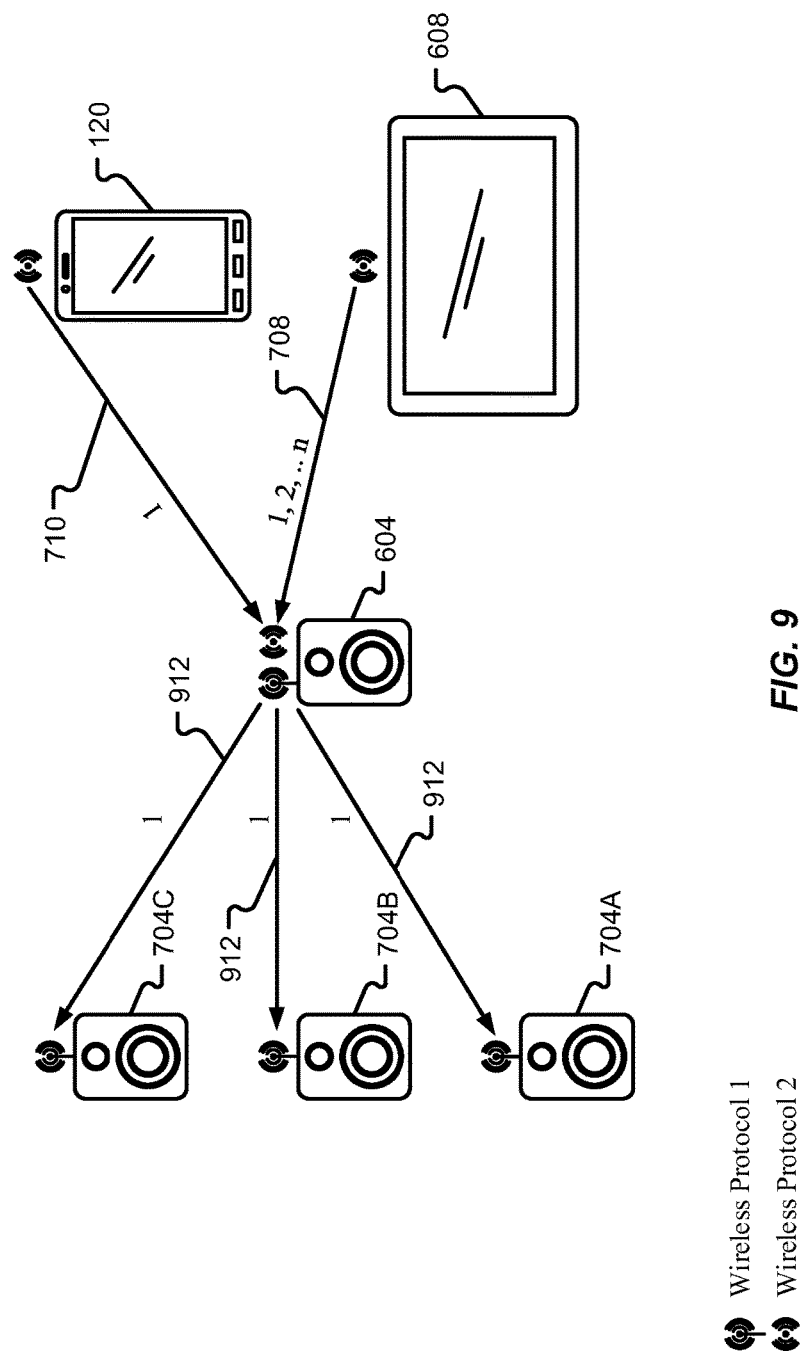
FIG. 9 depicts a fourth configuration of a wireless audio/video distribution system in accordance with at least some embodiments of the present disclosure.

FIG. 9 illustrates a configuration in which the digital audio stream is not separated into channels but is combined to become monaural. That is, the multichannel digital audio stream 708/710 is received from the connected device, such as the mobile device 120 and/or the tablet 608, via Bluetooth™, for example. A monaural stream 912 may then be transmitted via Wi-Fi, for example, to any number of speakers for simultaneous playback. That is, in such a configuration, the same speaker may be used in an array of speakers to play back monaural audio from a streamed source like those available in MP3 format, from a variety of sources, including mobile devices, which stream audio from their libraries or from the Internet. In this case, all speakers may play the same audio simultaneously to cover a large area like a whole house or outdoor party with sound. The audio file may be streamed from its source to a speaker using Bluetooth™ and the audio content is then sent to other speakers using a standard wireless protocol like Wi-Fi. Although FIG. 9 may illustrate an example configuration where speaker 604 receives the multi-channel audio stream 708/710 via Bluetooth™ (Wireless Protocol 1) and transmits a monaural audio stream 912 via Wi-Fi (Wireless Protocol 2), the exact wireless communication technology, standard, or network may be different. That is, references to Bluetooth™ and Wi-Fi are for illustrative purposes only and illustrate at least one configuration; other forms of wireless communication are contemplated. Alternatively, or in addition, the mobile devices 120 and/or tablet 608 may communicate with speakers 604, utilizing the previously described communication network 104 and/or a direct connection, such as Bluetooth™ and/or Wi-Fi direct, and the speaker 604 communicates with each of the speakers 704A-704C utilizing the previously described communication network 104 and/or a direct connection, such as Bluetooth™ and/or Wi-Fi direct.

Figure 10:
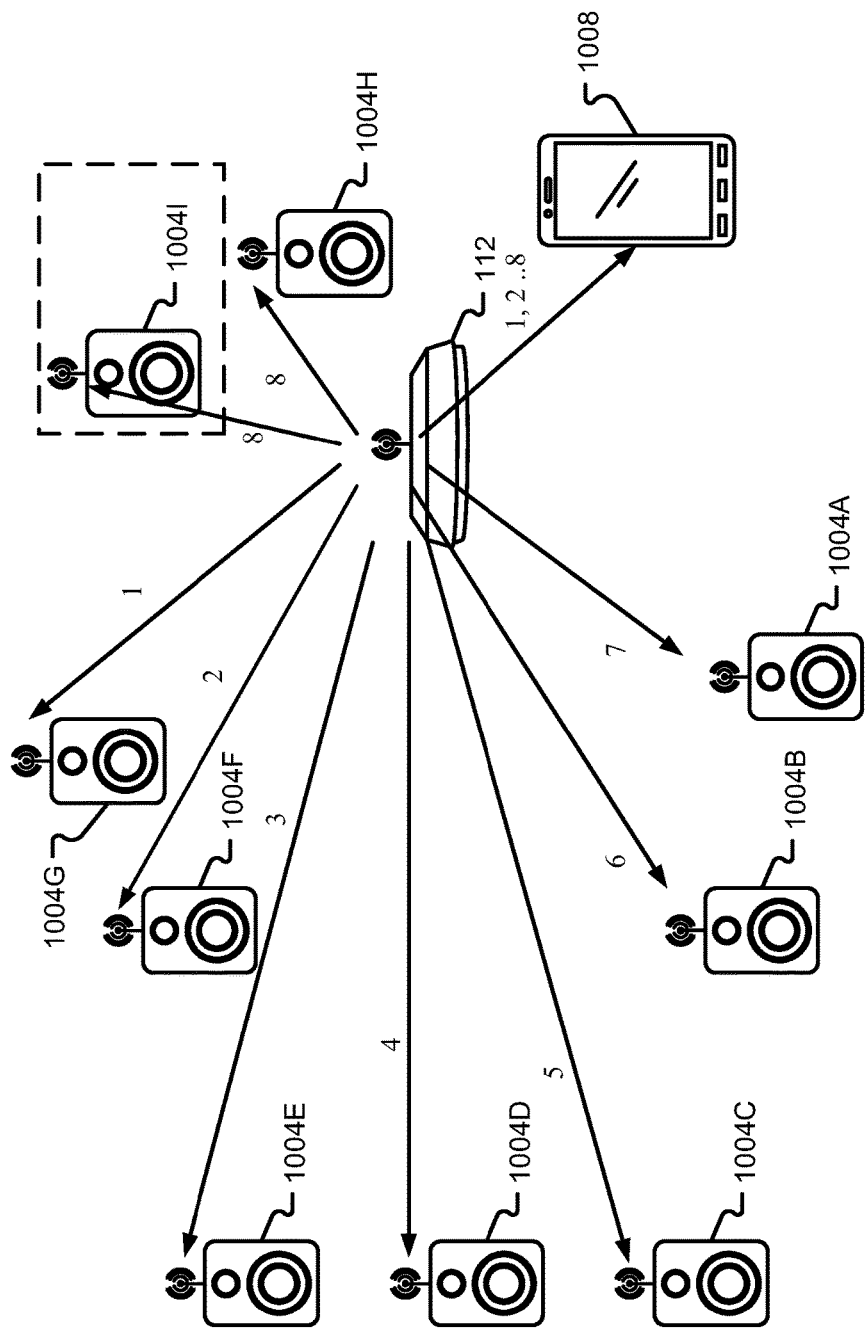
FIG. 10 depicts a fifth configuration of a wireless audio/video distribution system in accordance with at least some embodiments of the present disclosure.

FIG. 10 illustrates another example configuration in accordance with embodiments of the present disclosure. That is, the same speaker may be used to receive multichannel audio from a wireless audio video processor (AVP) 112. The wireless AVP 112 may receive audio from a variety of sources, separates the audio into discrete channels, and transits the audio channels, using a wireless protocol like Wi-Fi, to a receiver built into the speakers. Each individual audio channel is sent to and received by a different speaker for playback using the included Wi-Fi radios, such as communication interface 532. Playback of all channels simultaneously, with each channel playback time synchronized with the others, achieves the desired spatial effect of stereo or surround sound. Channel timing is achieved through implementation of a standard timing protocol, like TSF or 802.1AS.

More specifically, and as illustrated in FIG. 10, the AVP 112, may separate the audio into discrete channels and provide the discrete channels to respective speakers 1004A-1004I. As one example, the wireless audio/video processing unit 112 may receive or otherwise access an audio stream for a movie or other multimedia source. The audio stream may be provided from a television 116, from a content provider such as Netflix® or Hulu®, from a multimedia source local in communication with the communication network 104, from a multimedia instance resident on and/or directly accessible by the wireless audio/video processing unit 112, and/or the like. For example, within the storage 512, multimedia content, such as, but not limited to, a multimedia file and/or a portion of a multimedia file, may be stored, accessed, and decoded by the wireless audio/video processing unit 112. An audio stream associated with the multimedia file may be separated into one or more audio channels for playback at the one or more speakers 1004A-1004I in accordance with a specified and/or predetermined speaker configuration. For example, in accordance with a 7.1 surround sound configuration, such as the configuration illustrated in FIG. 2, the audio stream for the multimedia content may be separated into discrete channels 1, 2, 3, 4, 5, 6, 7, and 8, each of which may be received and played back at a specific time and at a respective speaker 1004A-1004I to achieve the desired spatial effect of stereo or surround sound. Therefore, by playing all channels simultaneously, the desired spatial effect of stereo or surround sound may be realized. The exact wireless communication technology, standard, or network may be different than that which is illustrated in FIG. 10. That is, references to Wi-Fi are for illustrative purposes only and illustrate at least one configuration; other forms of wireless communication are contemplated. For example, the wireless protocol may be BlueTooth™, Wi-Fi, and/or combinations thereof.

Further, and as illustrated in FIG. 10, the wireless audio/video processing unit 112 may provide the same audio stream to more than one speaker. For instance, speakers 1004H and 1004I may receive the same audio stream. In such an instance, a single location, for example a location associated with speakers 1004H and 1004I, may have multiple speakers assigned to it. In such a configuration, multiple speakers associated with a single location may increase the impact of a stereo system. For example, a user may utilize multiple subwoofers for the added effect of more bass. Such a configuration may also be associated with a predetermined or preselected speaker configuration, for example, but not limited to, a 7.2 speaker configuration as previously discussed.

In addition, mobile device 1008, which may be the same as or similar to the mobile device 120, may be utilized as an additional speaker or endpoint. As one example, the mobile device 1008 may be connected to a communication network 104 or otherwise accessible by the wireless audio/video processing unit 112. The mobile device 1008 may then receive content from the wireless audio/video processing unit 112 and the audio, including one or more audio channels, may be played out via a speaker of the mobile device 1008 and/or through a headphone jack of the mobile device 1008. For instance, at night when a user is in bed and the user's significant other wants to go to sleep, the user may continue to watch multimedia content, such as a movie or other content displayed on the television 116. In such an instance, the user may wear headphones and configure the wireless audio/video processing system 112 to send the audio to the user's mobile device 1008. Accordingly, the user can watch the video on the TV screen and listen to the audio using headphones while not disturbing the user's sleeping partner.

Figure 11:
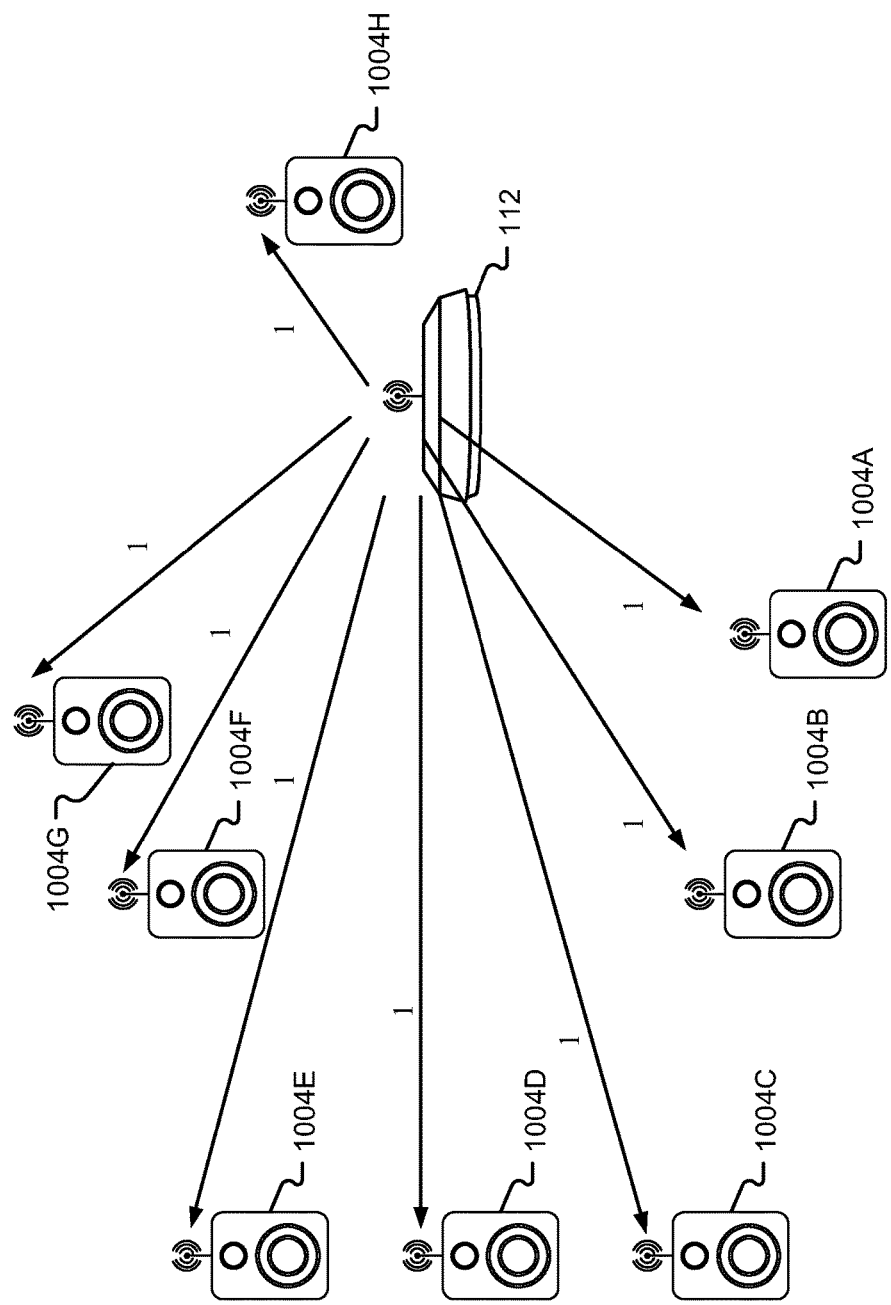
FIG. 11 depicts a sixth configuration of a wireless audio/video distribution system in accordance with at least some embodiments of the present disclosure.

Similar to the configuration of FIG. 9, FIG. 11 illustrates a configuration in which the speakers 1004A-1004H may be configured such that all speakers 1004A-1004H play back monaural audio simultaneously, as described above, to cover a large area, such as a whole house or outdoor party, with sound. As one example, the wireless audio/video processing unit 112 may receive or otherwise access an audio stream for a song or other audio content. The audio stream may be provided from a television 116, from a content provider such as Netflix® or Hulu®, from a multimedia source local in communication with the communication network 104, from a multimedia instance resident on and/or directly accessible by the wireless audio/video processing unit 112, and/or the like. For example, within the storage 512, a song, such as, but not limited to, an audio file and/or a portion of an audio file, may be stored, accessed, and decoded by the wireless audio/video processing unit 112. An audio stream associated with the audio file may be configured as a monaural audio stream for playback at the one or more speakers 1004A-1004H in accordance with a specified and/or predetermined speaker configuration. For example, the monaural audio stream may include a single channel for playback at a specific time and at a respective speaker 1004A-1004H, to achieve the desired spatial effect. For example, by playing the monaural audio simultaneously at all, or some, speakers, a desired "party mode" configuration and the sound associated therewith may be realized. The exact wireless communication technology, standard, or network may be different than that which is illustrated in FIG. 11. That is, references to Wi-Fi are for illustrative purposes only and illustrate at least one configuration; other forms of wireless communication are contemplated.

Figure 12:
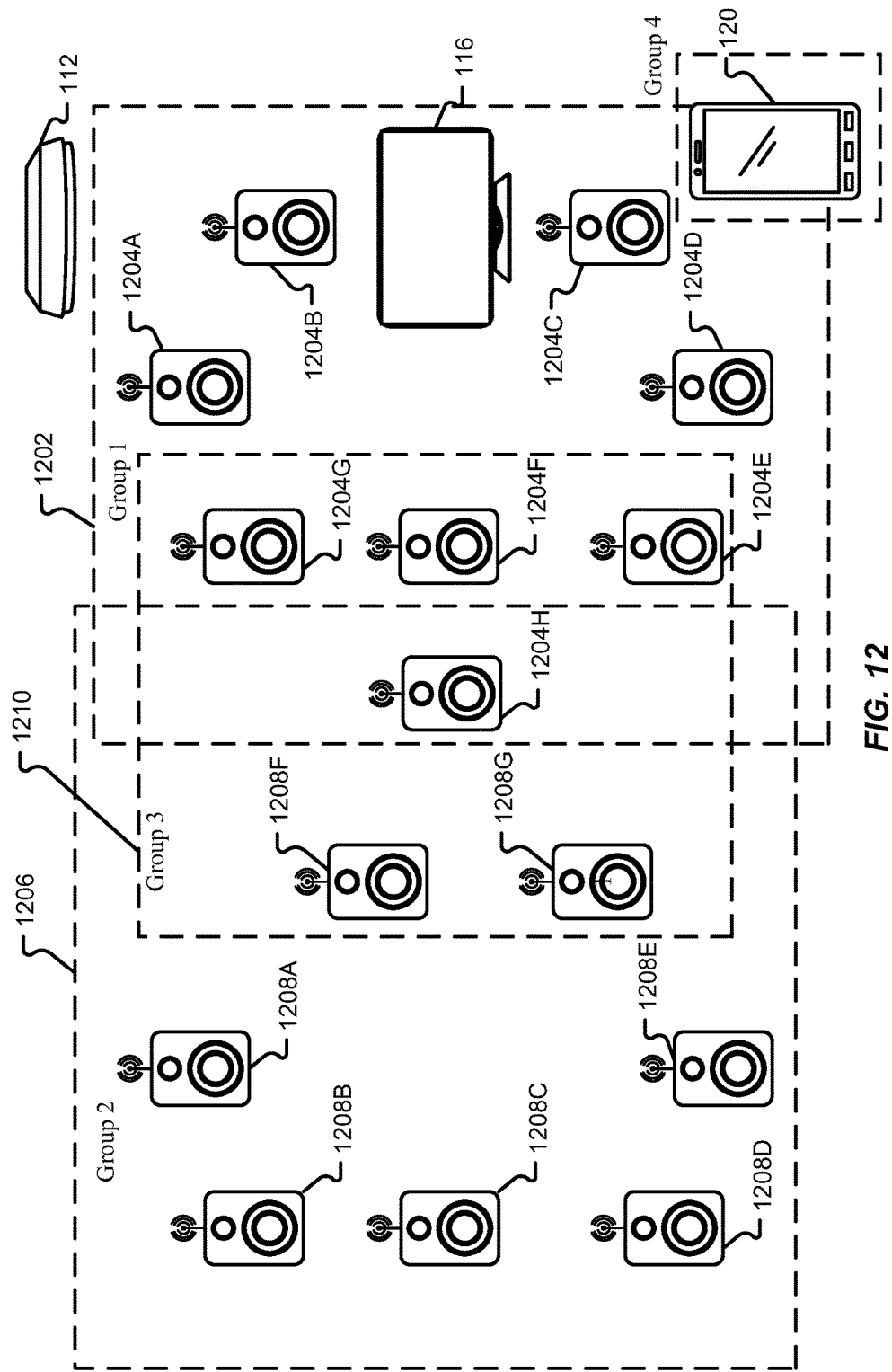
FIG. 12 depicts a seventh configuration of a wireless audio/video distribution system in accordance with at least some embodiments of the present disclosure.

FIG. 12 provides an example configuration whereby the speakers may be reconfigured on the fly and used in multi-room zones, also referred to as groups. For example, speakers used for rear surround sound in a 7.1 configuration may be rapidly reconfigured to play back stereo sound in another room leaving the original speakers in a 5.1 configuration. Speakers used for 7.1 and/or those used in a stereo application may be rapidly reconfigured to all play in party mode, all playing monaural audio simultaneously. For example, and as illustrated in at least FIG. 12, speakers 1204A-1204H may be utilized in a typical eight channel eight speaker 7.1 stereo audio configuration and may be designated as a first group (or zone), or group (zone) 1 1202. The grouping of speakers 1204A-1204H may correspond to a grouping of speakers in a first room or for a first purpose. In another configuration, group (zone) 2 1206 may include speakers 1208A-1208F, but lack an eighth speaker for a full 7.1 stereo audio configuration. Accordingly, speaker 1204H may be reconfigured on the fly, and added to the group (zone) 2, if needed, such that group (zone) 2, including speakers 1208A-1208F and 1204H, may be utilized as a typical eight channel eight speaker 7.1 stereo audio configuration. As another example, a group (zone) 3 1210 may include a sub-grouping of speakers from both groups (zone) 1 1202 and group (zone) 2 1206. That is, in another configuration, speakers 1208F, 1208G, 1204E-1204F may be utilized as a typical six channel six speaker 5.1 stereo audio configuration. Such groupings may be utilized with mobile device 120 and/or wireless audio/video processing unit 112, for example. Alternatively, or in addition, mobile device 120 may be utilized as an additional speaker or endpoint as previously discussed. For example, a single group (zone) such as group (zone) 4 may include the mobile device 120. Accordingly, the mobile device 120 may then receive content from the wireless audio/video processing unit 112 and the audio, including one or more audio channels, may be played out via a speaker of the mobile device 120 and/or through a headphone jack of the mobile device 120. In such an instance, the user may wear headphones and configure the wireless audio/video processing system 112 to send the audio to the separate speaker group (zone) that includes the mobile device 120. Accordingly, the user can watch the video on the TV screen and listen to the audio using headphones connected to the mobile device 120.

Figure 13:
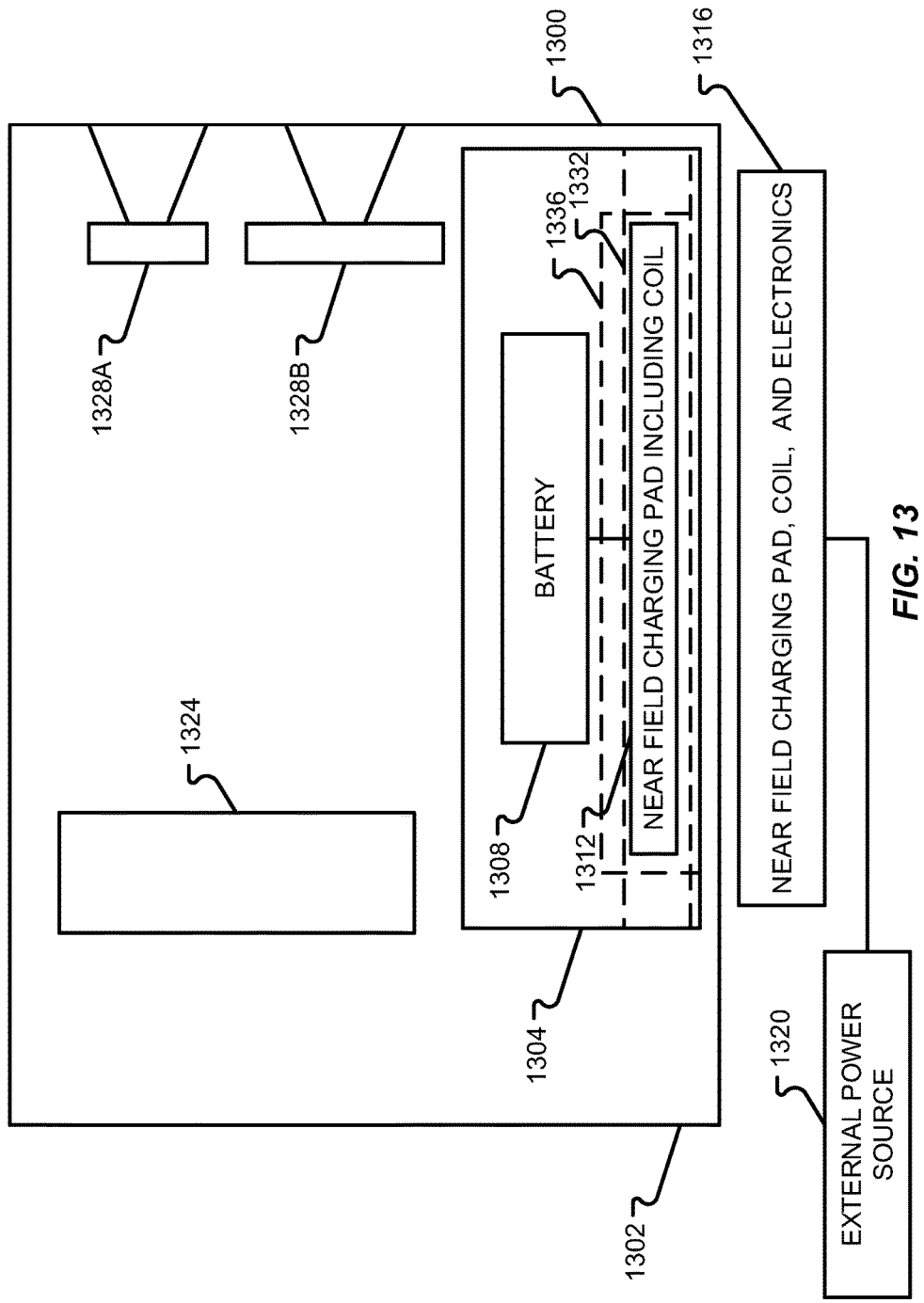
FIG. 13 depicts a first configuration of a wireless power supply system in accordance with embodiments of the present disclosure.

FIG. 13 illustrates additional details in accordance with at least one embodiment of the present disclosure. More particularly, as illustrated in FIG. 13, the speaker 1300 utilizes Near Field Charging coils to charge a battery 1308 in the speaker 1300. Speaker 1300 may be the same as or similar to the speakers described in FIGS. 1-12. Of course, the battery 1308 may be any charge storage device, such as a capacitor for example. Alternatively, or in addition, speaker 1300 may be a portable speaker. The power source 1304, provides power for the speaker 1300. That is, the battery 1308 may power the speaker 1300 for audio playback from a variety of sources when away from the charging pad 1316. A charging coil 1312 is placed inside the speaker 1300 and attached to the internal battery 1308. The coil 1312 may be embedded in the speaker cabinet, or housing 1302, such as the floor 1332, ceiling, backing, or other wall of the cabinet or housing 1302. Alternatively, or in addition, the coil may be molded inside a plastic wall, such as 1336. A second charging pad 1316 including a coil may be embedded in a pad outside the speaker 1300. The pad 1316 includes necessary electronics and is connected an external power source 1320. The external power source 1320 may include, but is not limited to, a 120 or 240 volt AC power source in a home and/or a 12 volt power source in an a vehicle. When the speaker 1300 is placed on or near the pad 1316, a current is induced in the internal coil 1312 and charges the battery 1308. The speaker 1300 can also play audio continuously when placed on the pad 1316, drawing power from the pad 1316 instead of the battery 1308. Once the battery 1308 is charged, the speaker 1300 may be removed and used to play audio, such as music, from a variety of sources until the battery 1308 is depleted. A user places the speaker 1300 on the charging pad 1316 again to recharge the battery 1300 and operate the speaker 1300. Similar to the power supply 344 in speaker in FIG. 3, the power supply 1304 provides power to the speaker electronics 1324 containing one or more circuits, and allowing an audio signal to be converted to a sound in one or more speaker drivers 1328A-1328B.

Examples of wirelessly transferring power include, but are not limited to, magnetic resonance solutions and electromagnetic inductance solutions. Magnetic resonance power technology is the near-field wireless transmission of electrical energy between two coils that are tuned to resonate at the same frequency. Based on the principles of electromagnetic coupling, resonance-based chargers may inject an oscillating current into a highly resonant coil, such as coil included in the pad 1316, to create an oscillating electromagnetic field. A second coil, such as coil 1312, with the same resonant frequency receives power from the electromagnetic field and converts it back into electrical current that can be used to power and charge the charge storage device 1308.

Induction chargers generally use an induction coil, such as a coil included in a pad 1316, to create an alternating electromagnetic field from within a charging base, and a second induction coil, such as 1312, in the portable device takes power from the electromagnetic field and converts it back into electric current to charge the charge storage device 1308. Although magnetic resonance and electromagnetic induction power transfer methods were described, it should be understood that other methods of wirelessly transmitting power to the speaker 1300 are contemplated.

Figure 14:
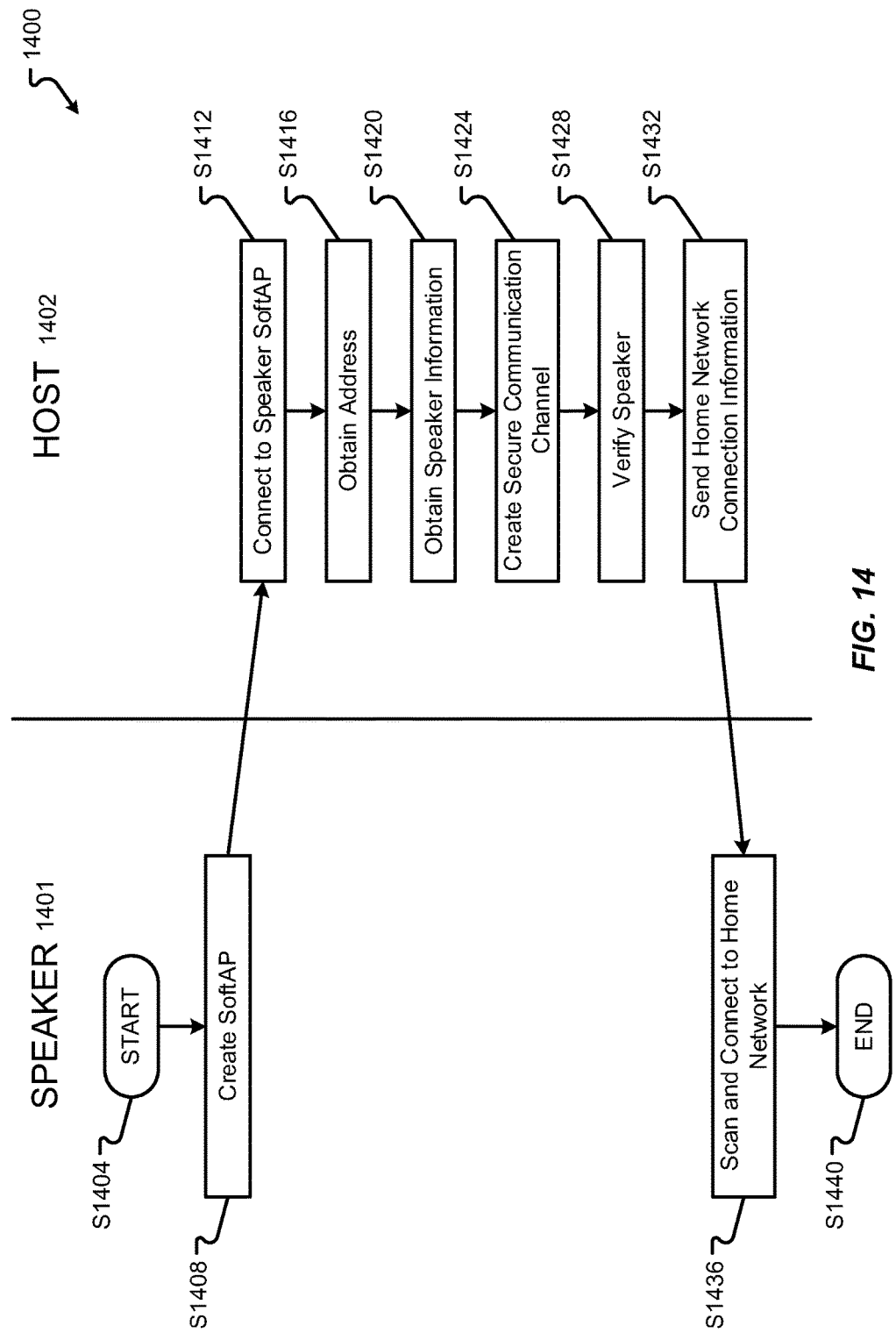
FIG. 14 is a flow chart depicting details of at least one embodiment in accordance with embodiments of the present invention.

Referring now to FIG. 14, a method 1400 of discovering one or more speakers 1401, such as speakers 108A-108B, and configuring such speakers in accordance with embodiments of the present disclosure is provided. Method 1400 is in embodiments, performed by one or more devices, such as a host device 1402 and a speaker device 1401. More specifically, one or more hardware and software components may be involved in performing method 1400. In one embodiment, one or more of the previously described units, or devices, perform one or more of the steps of method 1400. For example, the host device 1402 may refer to a mobile device 120 as previously described. Alternatively, or in addition, the host device 1402 may refer to the wireless audio/video processor 112. The host device 1402 and the speaker 1401 may perform all or at least some of the steps of method 1400. The method 1400 may be executed as a set of computer-executable instructions executed by at least one of the speaker 1401 and the host 1402 and encoded or stored on a computer-readable medium. Hereinafter, the method 1400 shall be explained with reference to systems, components, units, software, etc. described with FIGS. 1-13.

Method 1400 may continuously flow in a loop, flow according to a timed event, or flow according to a change in an operating or status parameter. Method 1400 may be imitated at step S1404, where an out of the box configuration of the speaker 1401 is initiated. That is, a speaker, such as speaker 1401, will create its own open or secured wireless access point in step S1408. Such access point may be referred to as a SoftAP and have a standardized service set identifier (SSID), or network name, of the form "NAMExxxx" where xxxx is a random character alphanumeric string of a fixed or variable length appended to an alphanumeric string of a known value and NAME is a known alphanumeric string of a fixed or variable length. The speaker 1401 may scan for existing SSIDs that match the random SSID it generated before hosting the SoftAP to confirm it is unique and will generate a new random string if it finds it. The process may repeat until the SSID is unique. Next, at step S1412, a speaker configuration application running on host 1402 may continuously scan in the background looking for new SSIDs, and if the speaker configuration application finds a new SSID of the form "NAMExxxx," the speaker configuration application will inform the user of the new speakers found and ask if they want to set them up. Accordingly, if the user wants to set up the new speakers, the speaker configuration application will connect to the speaker having the "NAMExxxx" SSID. Next, at step S1416, the host 1402 may obtain an address by giving itself a Link Local Address or using DHCP to obtain an IP address. At step S1420, the host 1402 may obtain speaker information by utilizing the Simple Service Discover Protocol (SSDP). Although the use of Link Local Address, DHCP, and SSDP has been described, other mechanisms for assigning addresses and/or other broadcast/multicast mechanisms may be utilized and are contemplated.

At step S1424, the host 1402 may create a secure connection to the speaker 1401. Such secure connection may include a cryptographic protocol designed to provide communication security over the network 104; such protocol may include, but is not limited to, a TLS connection. At step S1428, the host 1402 may utilize a physical mechanism, such as indicator 348, to have a user physically identify the speaker. Such physical mechanism may include a blinking LED, an audio tone, a playback of a number sequence or the like, which allows the speaker to be verified. At step S1432, the host 1402 may then send network information, such as the home network SSID and the key, or passphrase, to the speaker 1401. Such information is sent over the secure communication channel. The speaker 1401 may then scan, identify, and connect to the home network at step S1436. Method 1400 may then end at step S1440.

In some instances, there might not be a home network to which the speaker 1401 can connect. In this event, the host 1402 may create an access point to act as a configuration network and may use Wi-Fi protected setup (WPS) with a button press on the speaker to connect to it. Such a configuration process may be a fallback advanced mode for use cases when there is not a home network (such as outside at a park). Note that this is not necessary to use a preexisting group without the home network, this is only needed in the unlikely case that the group needs to be reconfigured "on the fly" when outside a user's home network.

Figure 15A:
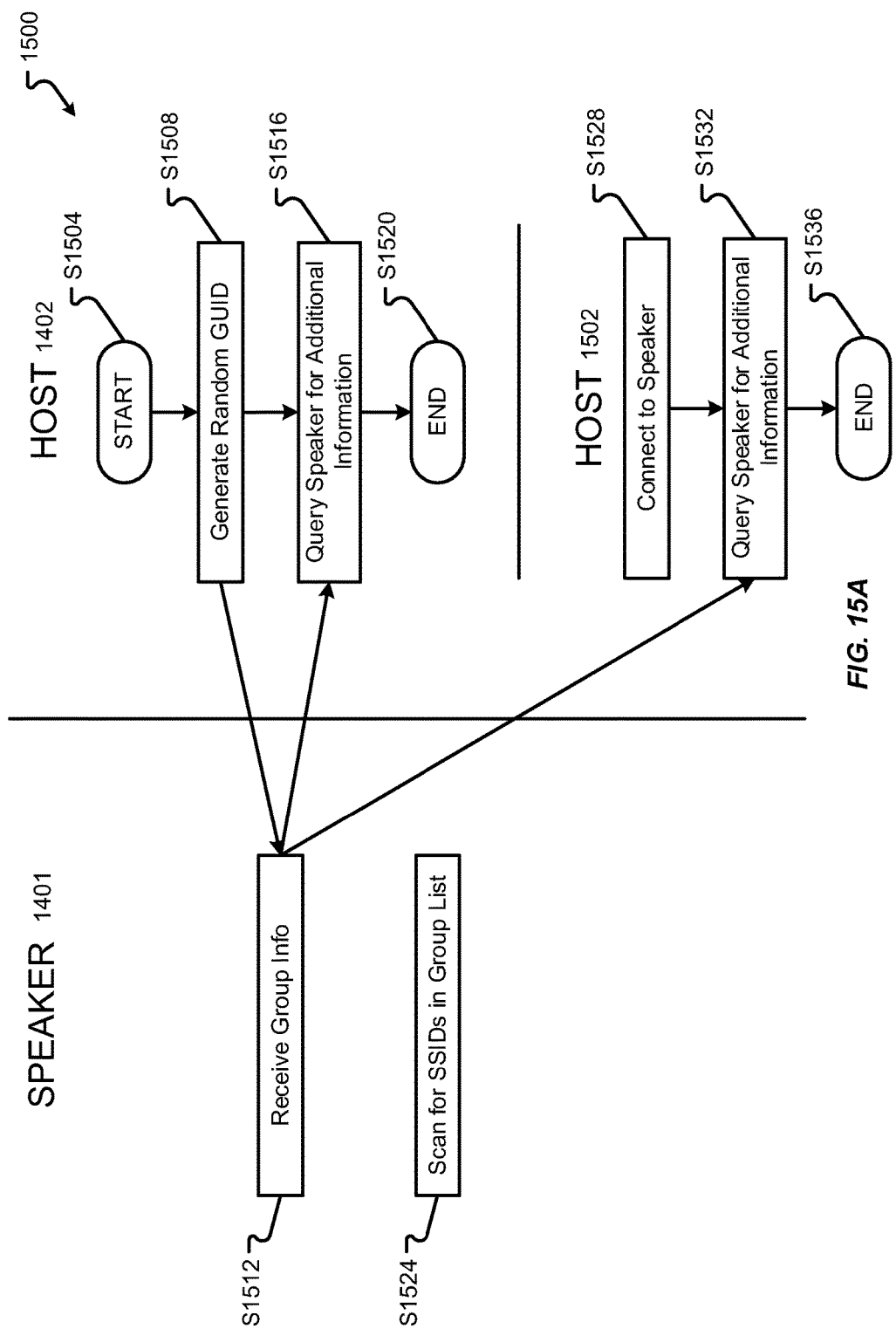
FIGS. 15A-15B depict a second flow chart depicting details of at least one embodiment in accordance with embodiments of the present invention.

Referring now to FIG. 15A, a method 1500 pertaining to group configuration of one or more speakers 1401, such as speakers 108A-108B, and configuring the group in accordance with embodiments of the present disclosure is provided. Method 1500 is in embodiments, performed by one or more devices, such as a host device 1402 and a speaker device 1401. More specifically, one or more hardware and software components may be involved in performing method 1500. In one embodiment, one or more of the previously described units, or devices, perform one or more of the steps of method 1500. For example, the host device 1402 may refer to a mobile device 120 as previously described. Alternatively, or in addition, the host device 1402 may refer to the wireless audio/video processor 112. The host device 1402 and the speaker 1401 may perform all or at least some of the steps of method 1500. The method 1500 may be executed as a set of computer-executable instructions executed by at least one of the speaker 1401 and the host 1402 and encoded or stored on a computer-readable medium. Hereinafter, the method 1500 shall be explained with reference to systems, components, units, software, etc. described with FIGS. 1-14.

Method 1500 may continuously flow in a loop, flow according to a timed event, or flow according to a change in an operating or status parameter. Method 1500 may be imitated at step S1504, where a request to create a new group is received; accordingly, the host 1402 generates a random globally unique identifier (GUID) for each new speaker group to be created at step S1508. When a new speaker group is created, the host 1402 may send information to the speaker 1401, which is received at step S1512. Such information may include, but is not limited to, a 64 bit timestamp in number of seconds since epoch of creation time, a 64 bit timestamp in number of seconds since epoch of last configuration change time, GUID, Group Friendly Name, Group Type (2.1, 5.1, 7.1, etc), the number of speakers, and the speaker location. Further, at step S1516, a host 1402 can query all of the group names and GUIDs a speaker knows or otherwise maintains in a list. This allows automatic propagation of groups to all hosts without having to setup a group again. The speaker may connect to each host 1402 at least once after a group has been added. Accordingly, this connection is not needed for initial configuration. For instance, if a speaker is added to a new group by host "A," for example host 1402, but host "B" 15020 does not necessarily know about that group yet, Host "B" 1502 can connect to the speaker at step S1528 in a Configuration mode to get the new group information. Alternatively, or in addition, when Host "B" 1502 connects to the speaker simply to play audio, Host "B" can query the group list at step S1532 to learn about the new groups, if any. In some embodiments, each time a host connects to a speaker for any reason, the host queries a group list to see if the group list has changed (including removal of groups). The process illustrated for host "B" 1502 may then end at step S1536.

Although the configuration process may end at step S1520, in some embodiments, speakers will look for each SSID in the group list even when connected to an existing SSID, for example at step S1524. If a speaker is connected to host "A" and finds known host "B," a user currently using the speaker may have the ability to transfer ownership or block such a transfer. That is, a set of rules may be provided that may be enabled or disabled per a speaker-host pairing that defines and manages the transfer of ownership logic. For instance, if host "A" is actively sending audio from a movie to a group of speakers, those listening to the group of speakers may or may not want to deal with a dialog box, or some other form of communication input, asking to allow transfer of one of the speakers currently being utilized in the group. On the other hand, if there is no audio being sent to a speaker, but the speaker and host pairing is active, some form of communication, such as a dialog box, may be provided to the user indicating that if no response is received in XX seconds, the speaker may automatically be allowed to transfer to another host. Moreover, in some embodiments, the host 1402 may provide a manner by which to remember decisions for XX minutes to prevent spamming of requests. Further, those using certain speakers, and/or speaker groups, may have the ability to white list or blacklist certain speakers, groups, or hosts.

Figure 15B:
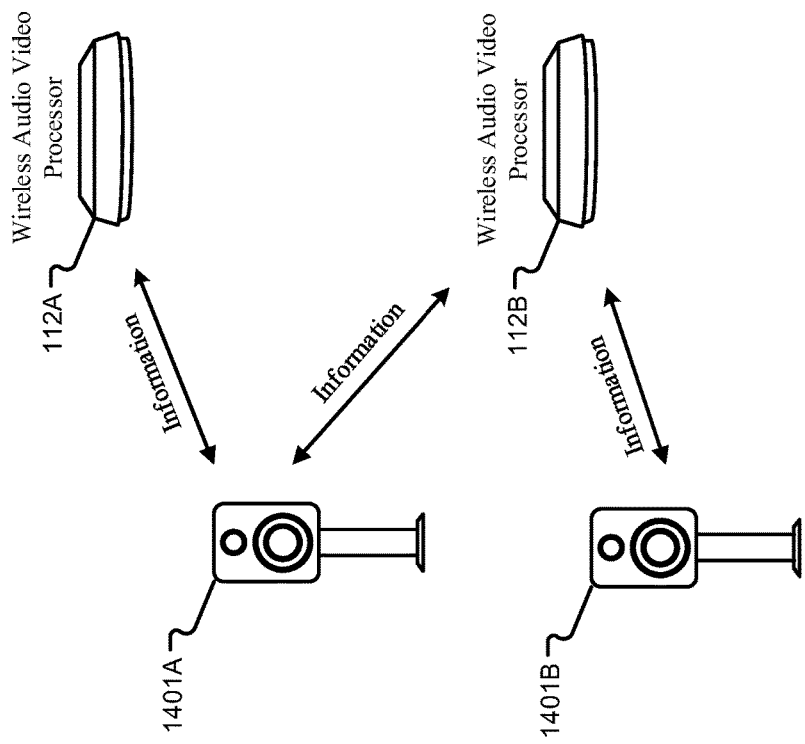

Further, as illustrated in FIG. 15B, the speaker 1401A may receive information from a first host, such as the wireless audio processor 112A, retain the information, and provide such information to a host, such as wireless Audio Video Processor 112B. Such information may be provided in an query step, such as in step S1532. Moreover, the second host, such as the wireless audio video processor 112B may provide the information to the speaker 1401B. Accordingly, the hosts, or wireless audio video processors 112 for example, can receive information from speakers even though the host does not directly connect with the speaker. Such information may include, but is not limited to the data structures and/or the information included in the data structures as illustrated and reference to in FIG. 22.

Figure 16:
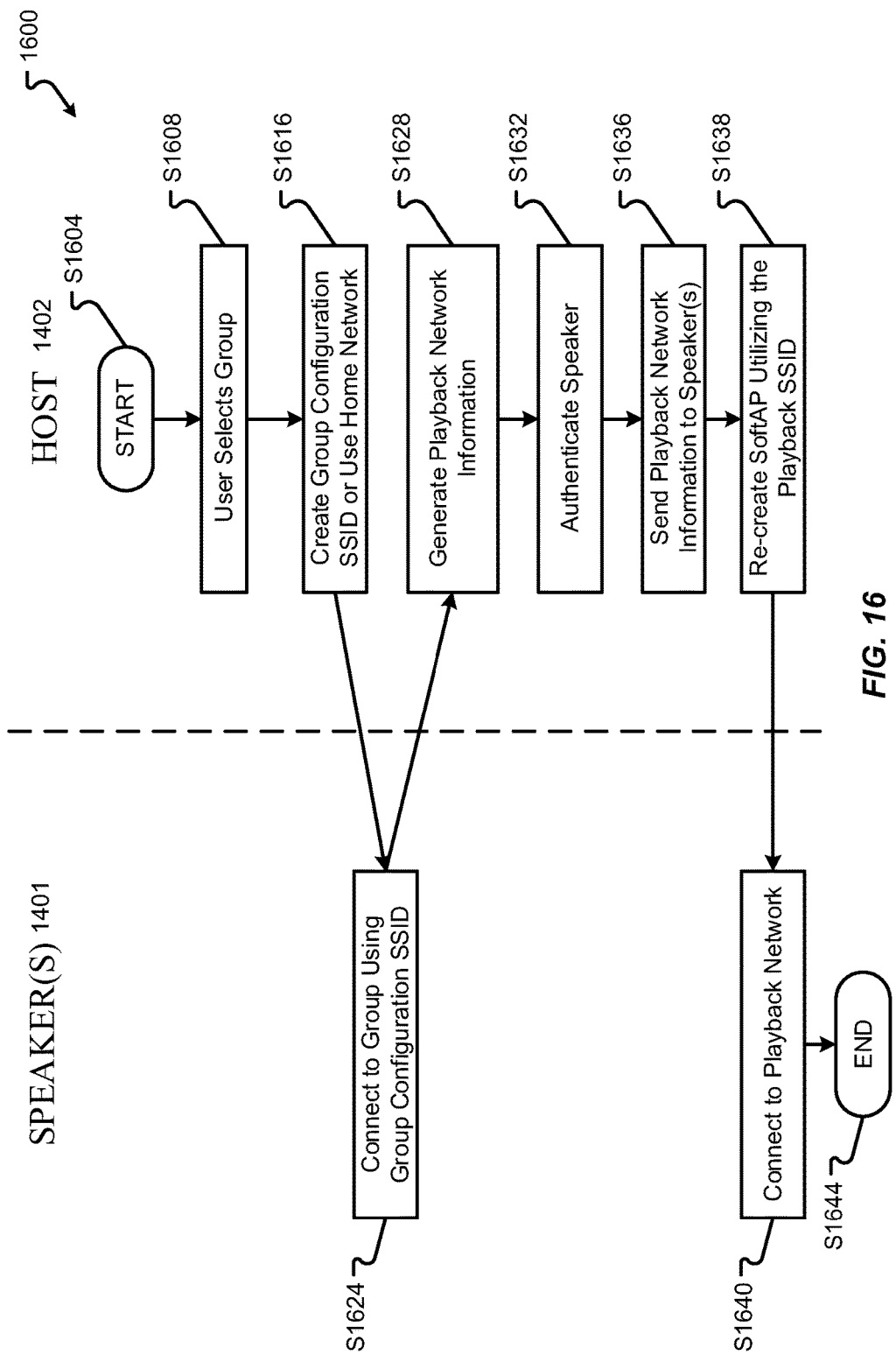
FIG. 16 is a third flow chart depicting details of at least one embodiment in accordance with embodiments of the present invention.

Referring now to FIG. 16, a method 1600 pertaining to a speaker usage connection method, in accordance with embodiments of the present disclosure is provided. Method 1600 is in embodiments, performed by one or more devices, such as a host device 1402 and a speaker device 1401. More specifically, one or more hardware and software components may be involved in performing method 1600. In one embodiment, one or more of the previously described units perform one or more of the steps of method 1600. For example, the host device 1402 may refer to a mobile device 120 as previously described. Alternatively, or in addition, the host device 1402 may refer to the wireless audio/video processor 112. The host device 1402 and the speaker 1401 may perform all or at least some of the steps of method 1600. The method 1600 may be executed as a set of computer-executable instructions executed by at least one of the speaker 1401 and the host 1402 and encoded or stored on a computer-readable medium. Hereinafter, the method 1600 shall be explained with reference to systems, components, units, software, etc. described with FIGS. 1-15.

Method 1600 may continuously flow in a loop, flow according to a timed event, or flow according to a change in an operating or status parameter. Method 1600 may be initiated at step S1604 after a group has been established and a host, such as host 1402, wants access to or to use a group. Accordingly, at step S1608, a user may select a group to use and such selection may be received at the host 1402. Alternatively, or in addition, a default group or last group selected may be used automatically. For example, when a host device is turned on, the host device may automatically use the last group selected. Method 1600 then proceeds to step S1616 where the host 1402 creates an open or secured network with the Group Configuration SSID. The Group Configuration SSID is a special network that the speaker always searches for specifically to allow a host, such as host 1402, to discover the speakers and configure them. In some embodiments, the Group Configuration SSID is not intended to be used for anything except configuration. Alternatively, or in addition, in instances where the Group Configuration SSID is the user's home network, the host would not create the Group Configuration SSID; rather, the host would utilize the existing user's home network. Accordingly, the speakers in the group will connect to the host, such as host 1402, using the Group Configuration SSID, at step S1624. Once all of the speakers in the group connect to the host 1402, host 1402 may generate a random SSID, which may be referred to as a Playback SSID and passphrase, or key, at step S1628; the host 1402 will know how many speakers are in the group based on querying the group list from the speakers.

On devices that support multiple hosted access points, the Group Configuration SSID may be made available immediately by which speakers can connect. To prevent disruption during instances where power is lost, the Playback SSID and passkey may be stored in memory, such as memory 312; accordingly, during a hardware reset, the configured speaker may resume normal operation. At step S1632, the host 1402 may authenticate the speakers as a secure playback device using RSA, RSA being a public key encryption system. That is, the host 1402 may utilize a trusted certification chain to authenticate the one or more speakers. If authentication fails, the speaker may still be used for non-secure content. In some embodiments, the speaker 1401 itself does not do any authentication or revocation; rather, all authentication is handled by the host 1402. The authentication procedure may be performed in the following order:

i. Set up TLS connection;
ii. Request RSA public key;
iii. Verify RSA certificate chain is not revoked;
iv. Send random nonce to speaker;
v. Receive signed random nonce back;
vi. Verify signature of random nonce.

At step S1636, the host 1402 may send the Playback SSID and the passphrase, or key, to all of the speakers configuring the group. Such Playback SSID and passphrase may be sent over TLS/JSONRPC or other secure protocol. Once the host 1402 has sent the Playback SSID and the passphrase, the host 1402 may disconnect the SoftAP, i.e. the Group Configuration SSID, causing all speakers to disconnect. At step S1638, the host 1402 may then re-create a SoftAP utilizing the Playback SSID and the random passphrase that was previously sent to all of the speakers.

At step S1640, each speaker 1401 may then connect to the Playback SSID using the random passphrase. The speakers, being securely connected to the host 1402, are now ready to play audio. Method 1600 then ends at step S1644. However, similar to step S1524, the speakers may continuously scan for known group IDs while playing audio. That is, if a known group ID is found, a message may be sent to the current host 1402 such that the host 1402 may inform a user and determine whether the host 1402 should release the speakers such that the speakers may connect to another group.

The method 1600 occurs under the assumption that the speakers have gone through the "Out of the Box" procedure and are connected to the home network. If there is no home network, a user may choose to enable the "Direct Configuration" mechanism to create a temporary configuration AP and use WPS to connect the speakers to it. Either way it is assumed the host and speakers are already connected to the same network.

Figure 17:
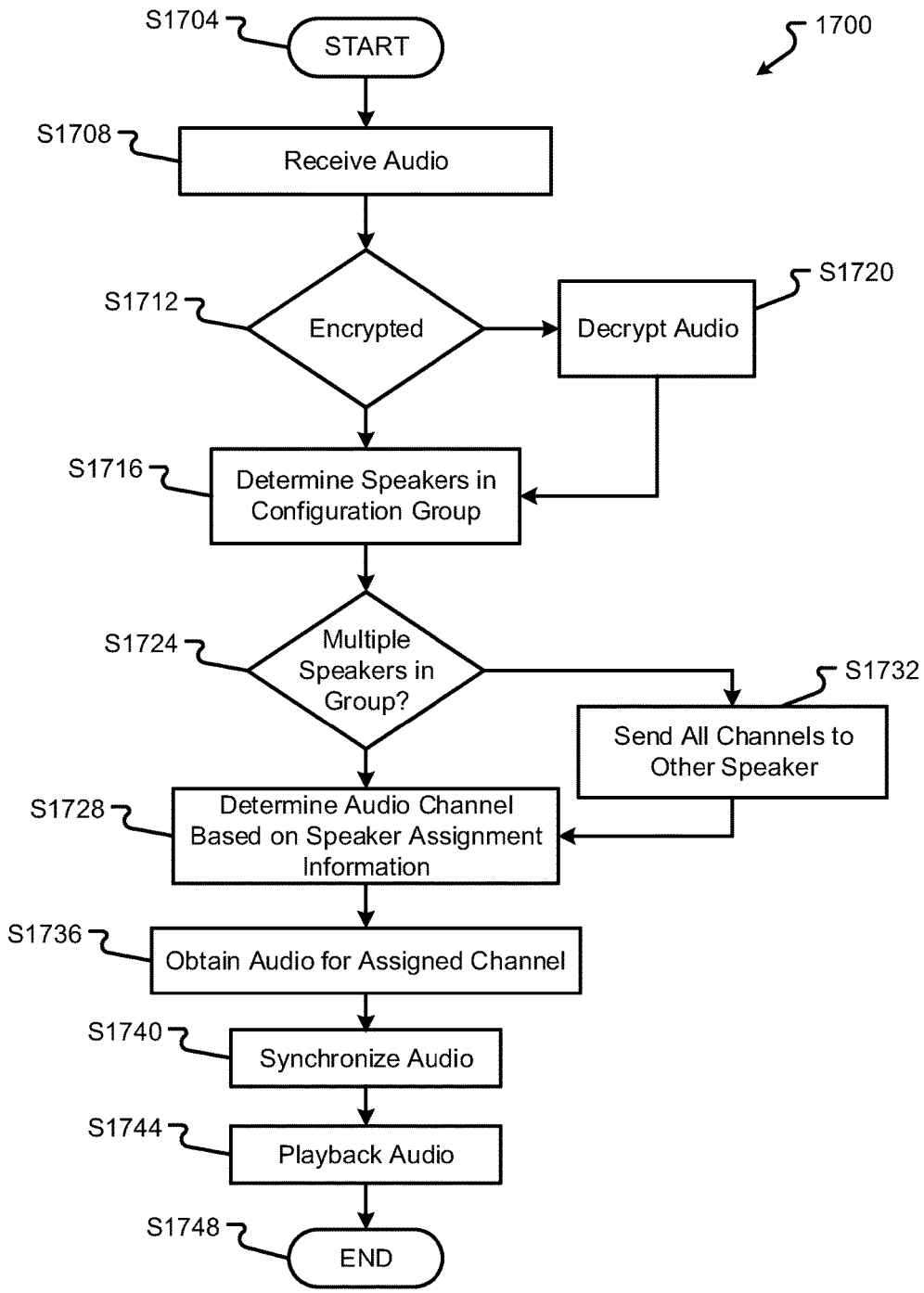
FIG. 17 is a fourth flow chart depicting details of at least one embodiment in accordance with embodiments of the present invention.

Referring now to FIG. 17, a method 1700 illustrating an example audio dissemination process in accordance with embodiments of the present disclosure is provided. Method 1700 is in embodiments, performed by one or more devices, such as a speaker 604, a wireless audio/video processing unit 112, and/or a mobile device 120. More specifically, one or more hardware and software components may be involved in performing method 1700. In one embodiment, one or more of the previously described units, or devices, perform one or more of the steps of method 1700. The method 1700 may be executed as a set of computer-executable instructions executed by at least one of the speaker 604, the wireless audio/video processing unit 112, and/or the mobile device 120 and encoded or stored on a computer-readable medium. Hereinafter, the method 1700 shall be explained with reference to systems, components, units, software, etc. described with respect to FIGS. 1-16.

Method 1700 may continuously flow in a loop, flow according to a timed event, or flow according to a change in an operating or status parameter. Method 1700 may be initiated at step S1704 where a multichannel audio stream is provided from one or more sources of multichannel audio. At step S1708, the multichannel audio stream may be received and if it is determined, at step S1712, that the multichannel audio stream is encrypted, the multichannel audio stream may be decrypted at step S1720. Once the multichannel audio stream has been decrypted, or if the multichannel audio stream is not encrypted, the method 1700 proceeds to step S1716 where the speakers in the speaker group are identified and/or located. If, at step S1724, it is determined that there is more than one speaker in the speaker group, all channels of the multichannel audio stream, a single channel of the multichannel audio stream, and/or a single channel of the multichannel audio stream assigned to a specific speaker, may be sent to the specific or respective speakers in the configuration group at step S1732. Each channel may be time synchronized with the other channels before or after it is sent to the specific or respective speakers in the speaker group at step S1732. Accordingly, at step S1728, an audio channel assigned to the local or specific speaker may be determined based on speaker assignment information obtained either from the speaker 604, the wireless audio/video processing unit 112, the mobile device 120, and/or from speaker configuration information located on the speaker itself. For example, the data structures 2204, 2208, 2248, and 2256 may be consulted to determine which speakers are assigned to which group and which speakers in the group correspond to which audio channel. Accordingly, at step S1736, the audio for the assigned channel may be separated from the multichannel audio stream. Thereafter, the single channel of audio that was separated from the multichannel audio may be subjected to a time-synchronization process at step S1740 and the audio may then be played back at step S1744. Method 1700 may then end at step S1748.

Figure 18:
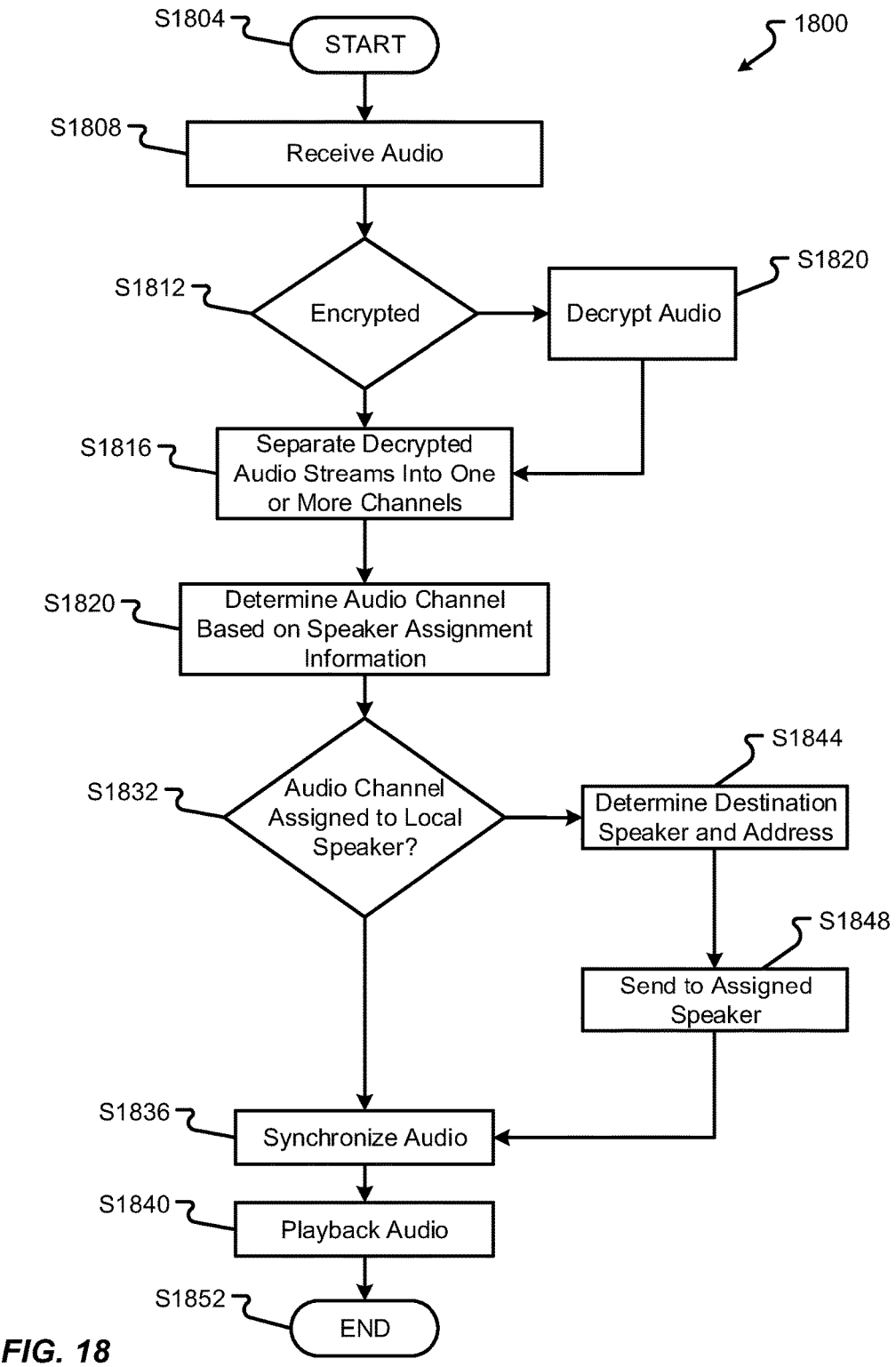
FIG. 18 is a fifth flow chart depicting details of at least one embodiment in accordance with embodiments of the present invention.

Referring now to FIG. 18, a method 1800 illustrating an example audio dissemination process in accordance with embodiments of the present disclosure is provided. Method 1800 is in embodiments, performed by one or more devices, such as a speaker 604, a wireless audio/video processing unit 112, and/or a mobile device 120. More specifically, one or more hardware and software components may be involved in performing method 1800. In one embodiment, one or more of the previously described units perform one or more of the steps of method 1800. The method 1800 may be executed as a set of computer-executable instructions executed by at least one of the speaker 604, the wireless audio/video processing unit 112, and/or the mobile device 120 and encoded or stored on a computer-readable medium. Hereinafter, the method 1800 shall be explained with reference to systems, components, units, software, etc. described with respect to FIGS. 1-17.

Method 1800 may continuously flow in a loop, flow according to a timed event, or flow according to a change in an operating or status parameter. Method 1800 may be initiated at step S1804 where a multichannel audio stream is provided from one or more sources of multichannel audio.

At step S1808, the multichannel audio stream may be received and if it is determined, at step S1812, that the multichannel audio stream is encrypted, the multichannel audio stream may be decrypted at step S1820. Once the multichannel audio stream has been decrypted, or if the multichannel audio stream is not encrypted, the method 1800 proceeds to step S1816 where the multichannel audio stream is separated into one or more channels of audio data. Based on group configuration information, speaker assignment information, and channel assignment information, for each channel of audio, the speaker assigned to that channel is identified at step S1820. For example, the data structures 2204, 2208, 2248, and 2256 may be consulted to determine which speakers are assigned to which group and which speakers in the group correspond to which audio channel. Thereafter, the method S1800 may determine whether a specific audio channel is assigned to the local speaker at step S1832, such as speaker 604. If so, the method S1800 may proceed to step S1836 where a time-synchronization process is performed. Alternatively, or in addition, for each channel of audio, the destination speaker and destination address may be determined at step S1844. In accordance with embodiments of the present disclosure, each channel is then sent to the assigned speaker at step S1848. Each speaker then performs a time synchronization process to synchronize the audio throughout the configuration group at step S1836. At step S1840, the audio is played at each speaker within the group and the method 1800 then ends at step S1852.

Figure 19:
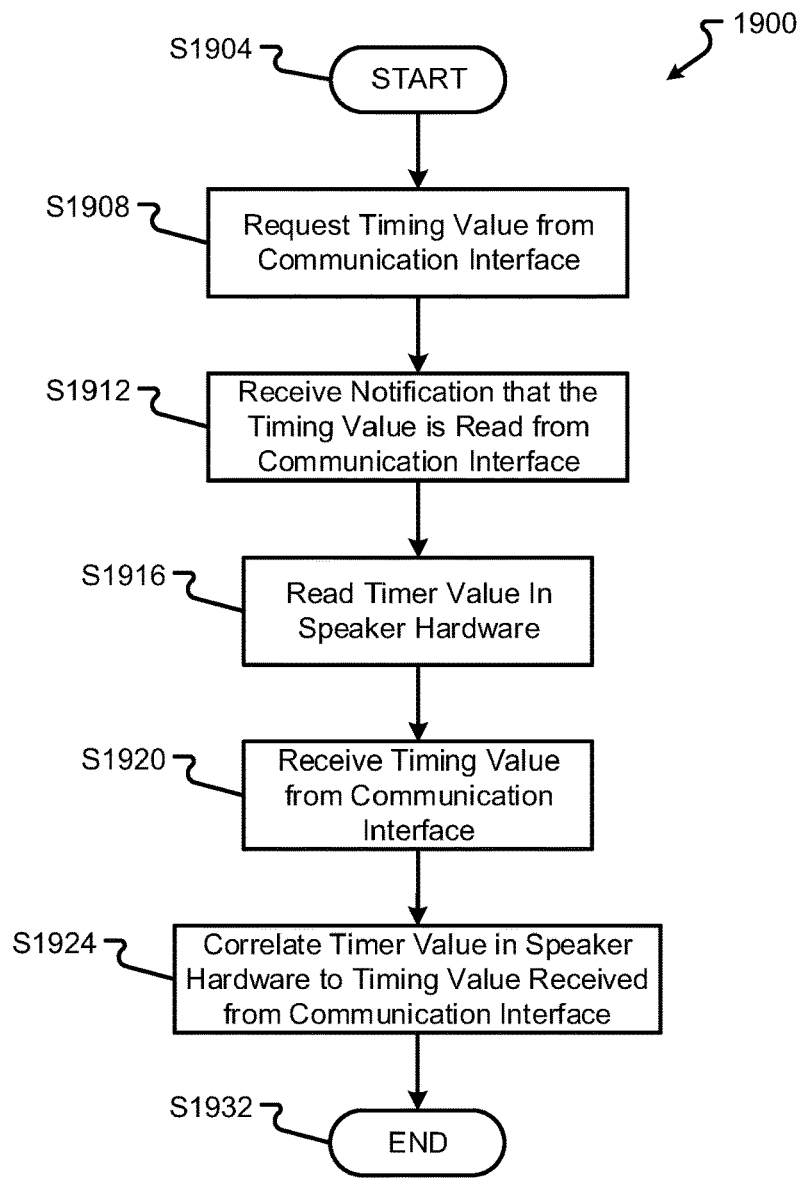
FIG. 19 is a sixth flow chart depicting details of at least one embodiment in accordance with embodiments of the present invention.

Referring now to FIG. 19, a method 1900 illustrating an example synchronization process between a communication interface, such as communication interface 320, and a processor of a speaker, such as processor 308 of speaker 300, is provided. Method 1900 is in embodiments, performed by one or more devices, such as a speaker 300, 604. More specifically, one or more hardware and software components may be involved in performing method 1900. In one embodiment, one or more of the previously described units perform one or more of the steps of method 1900. The method 1900 may be executed as a set of computer-executable instructions executed by at least one of the speaker 300, 604 and encoded or stored on a computer-readable medium. Hereinafter, the method 1900 shall be explained with reference to systems, components, units, software, etc. described with respect to FIGS. 1-18.

Method 1900 may continuously flow in a loop, flow according to a timed event, or flow according to a change in an operating or status parameter. Method 1900 may be imitated at step S1904 where, according to a timed event for example, a timing value may be requested from the communication interface of the speaker 300. For example, the timing value may be requested from timer 412 of communication interface 420 at step S1908. Accordingly, at step S1912, the processor 308 may receive a notification that the timing value from the timer 412 has been read. Method 1900 then proceeds to step S1916, where the timer value in the speaker 300 hardware is read. For example, the timing value in the speaker hardware may be read from the timer 408. At step S1920, the timing value read from timer 412 of communication interface 420 may be received at the processor 308. At step S1924, the timer value read from the timer 408 is correlated to the timing value received from the timer 412 of the communication interface. Accordingly, the speaker 300 and any other speaker within a configuration group, may agree on a synchronized time based on the network time. Method 1900 ends at step S1932.

Figure 20:
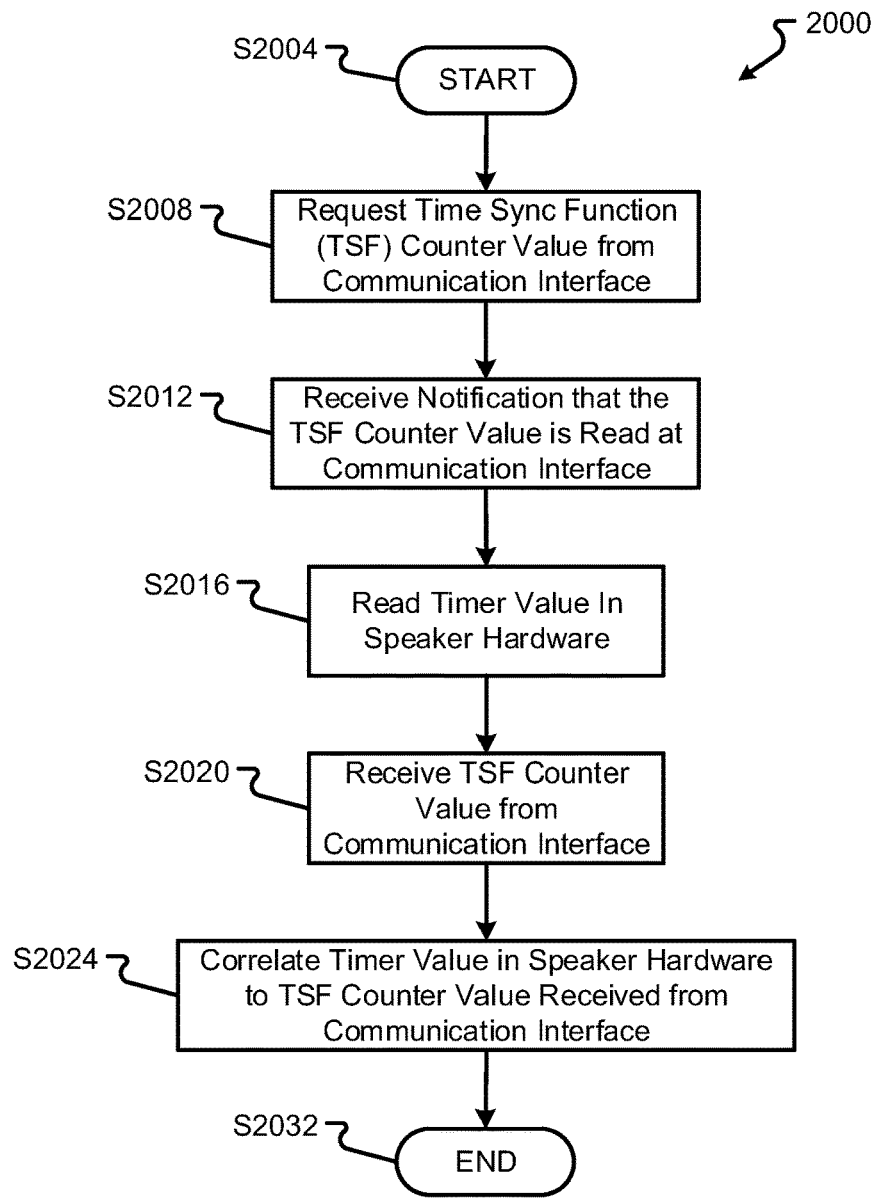
FIG. 20 is a seventh flow chart depicting details of at least one embodiment in accordance with embodiments of the present invention.

Referring now to FIG. 20, a method 2000 illustrating an example synchronization process between a communication interface, such as communication interface 320, and a processor of a speaker, such as processor 308 of speaker 300, utilizing the Time Synchronization Function of 802.11 is provided. Method 2000 is in embodiments, performed by one or more devices, such as a speaker 300, 604. More specifically, one or more hardware and software components may be involved in performing method 2000. In one embodiment, one or more of the previously described units perform one or more of the steps of method 2000. The method 2000 may be executed as a set of computer-executable instructions executed by at least one of the speaker 300, 604 and encoded or stored on a computer-readable medium. Hereinafter, the method 2000 shall be explained with reference to systems, components, units, software, etc. described with respect to FIGS. 1-19.

Method 2000 may continuously flow in a loop, flow according to a timed event, or flow according to a change in an operating or status parameter. Method 2000 may be imitated at step S2004 where, according to a timed event for example, a timing value may be requested from the communication interface of the speaker 300. For example, the Time Synchronization Function (TSF) counter value may be requested from timer 412 of communication interface 420 at step S2008. Accordingly, at step S2012, the processor 308 may receive a notification that the TSF value from the timer 412 has been read. Method 2000 then proceeds to step S2016, where the timer value in the speaker 300 hardware is read. For example, the timing value in the speaker hardware may be read from the timer 408. At step S2020, the TSF value read from timer 412 of communication interface 420 may be received at the processor 308. At step S2024, the TSF value read from the timer 408 is correlated to the timing value received from the timer 412 of the communication interface. Accordingly, the speaker 300 and any other speaker within a configuration group, may agree on a synchronized time based on the network time. Method 2000 ends at step S2032.

Figure 21:
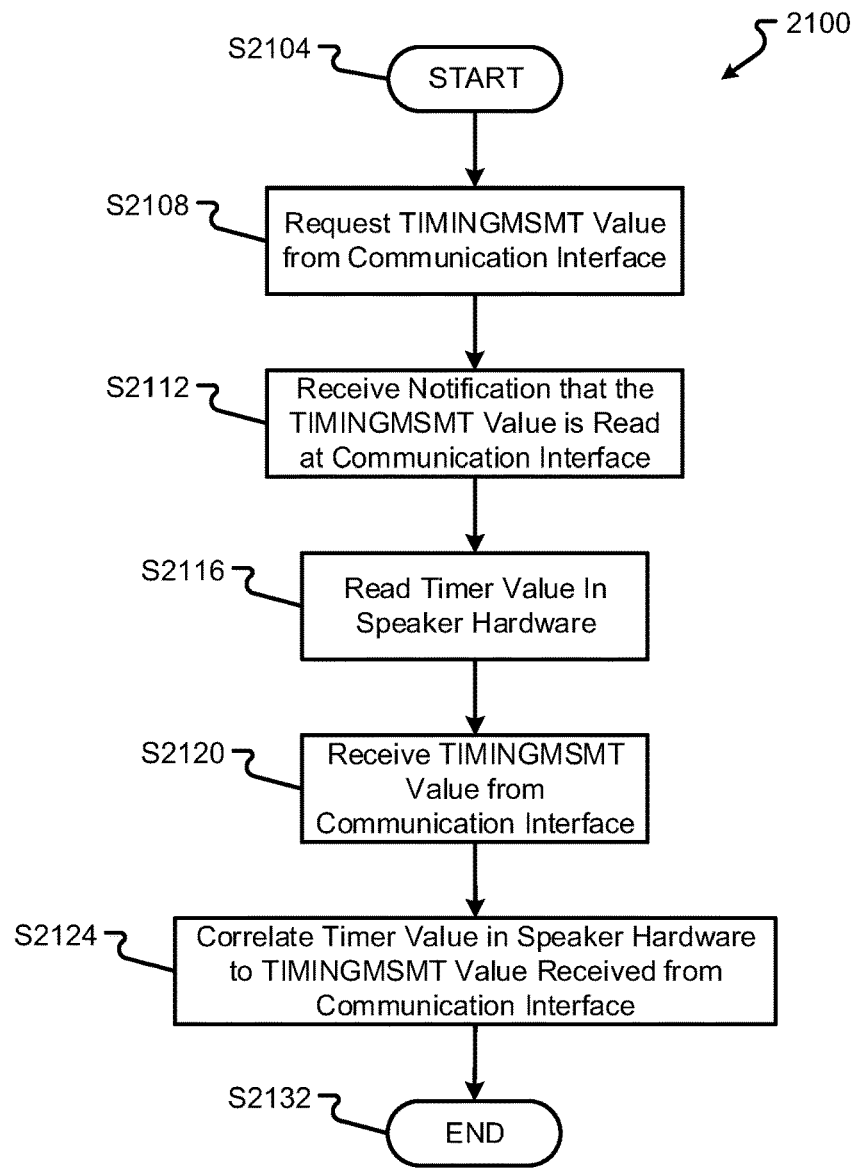
FIG. 21 is an eighth flow chart depicting details of at least one embodiment in accordance with embodiments of the present invention.

Referring now to FIG. 21, a method 2100 illustrating an example synchronization process between a communication interface, such as communication interface 320, and a processor of a speaker, such as processor 308 of speaker 300, utilizing the TIMINGMSMT value of 802.11v is provided. Method 2100 is in embodiments, performed by one or more devices, such as a speaker 300, 604. More specifically, one or more hardware and software components may be involved in performing method 2100. In one embodiment, one or more of the previously described devices perform one or more of the steps of method 2100. The method 2100 may be executed as a set of computer-executable instructions executed by at least one of the speaker 300, 604 and encoded or stored on a computer-readable medium. Hereinafter, the method 2100 shall be explained with reference to systems, components, units, software, etc. described with respect to FIGS. 1-20.

Method 2100 may continuously flow in a loop, flow according to a timed event, or flow according to a change in an operating or status parameter. Method 2100 may be imitated at step S2104 where, according to a timed event for example, a TIMINGMSMT value may be requested from the communication interface of the speaker 300. For example, the TIMINGMSMT counter value may be requested from timer 412 of communication interface 420 at step S2108. Accordingly, at step S2112, the processor 308 may receive a notification that the TIMINGMSMT value from the timer 412 has been read. Method 2100 then proceeds to step S2116, where the timer value in the speaker 300 hardware is read. For example, the timing value in the speaker hardware may be read from the timer 408. At step S2120, the TIMINGMSMT value read from timer 412 of communication interface 420 may be received at the processor 308. At step S2124, the TIMINGMSMT value read from the timer 408 is correlated to the timing value received from the timer 412 of the communication interface. Accordingly, the speaker 300 and any other speaker within a configuration group, may agree on a synchronized time based on the network time. Method 2100 ends at step S2132.

Figure 22:
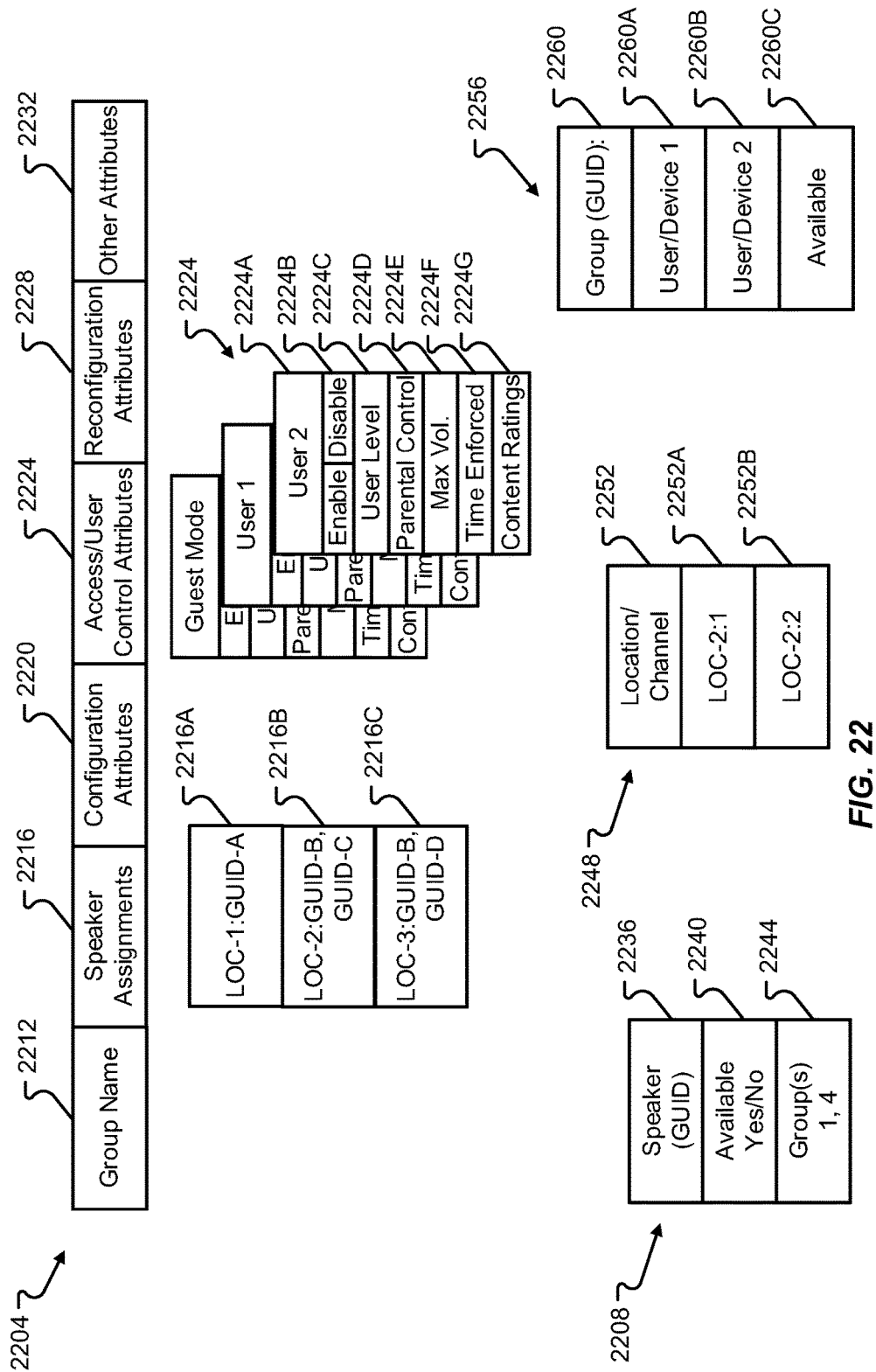
FIG. 22 is a block diagram depicting data structures in accordance with at least some embodiments of the present disclosure.

FIG. 22 is a block diagram depicting one or more data structures in accordance with at least some embodiments of the present disclosure. A first data structure 2204 generally relates to information and one or more parameters associated with one or more speaker groups or zones. The first data structure 2204 may be stored within the storage 412 of the wireless audio/video processing unit 112 and/or the speaker 604 and may include a group name field 2212 that includes or is otherwise associated with a speaker group name. The first data structure 2204 may additionally include the speaker assignments; such speaker assignments may be stored in the speaker assignment field 2216. That is, the speaker assignments may be the speakers that are part of or otherwise members of the group identified by the group name field 2212, otherwise known as a group identifier. For example, the speaker assignment field 2216 may include a globally unique speaker identifier, such as GUID-A, and the associated location, such as LOC-1 as depicted in 2216A. Alternatively, or in addition, the speaker assignment field 2216 may include two or more globally unique speaker identifiers, such as GUID-B and GUID-C (e.g. two speakers), and the associated location LOC-2, as depicted in 2216B. That is, as previously discussed, and in some embodiments more than one speaker may be assigned to a location and/or channel. Alternatively, or in addition, the speaker assignment field 2216 may include two or more globally unique speaker identifiers, such as GUID-B and GUID-D (e.g. two speakers), and the associated location LOC-3, as depicted in 2216C. That is, as previously discussed, and in some embodiments more than one speaker may be assigned to a location and/or channel and a speaker may be assigned to one or more locations.

The first data structure 2204 may also include a group configuration attributes field 2220; the group configuration attributes field 2220 may include the selected speaker group configuration, such as 7.1, 5.1, and/or 2.1. Alternatively, or in addition, the group configuration attributes field 2220 may also include one or more speaker group configurations capable of being selected based on a number and/or type of speakers within the group.

The first data structure may also include an access control/user control attributes field 2224. The access control/user control attributes field 2224 may generally include a list of authorized users that are able to use the speaker group identified by the speaker group name 2212. For example, the User 1 and User 2 may be authorized users of a speaker group. The access control/user control attributes field 2224 may also include additional parameters related to each of the users. For example, the access control/user control attributes field 2224 may indicate whether each user as identified in field 2224A is enabled or disabled 2224B, that is whether each user, though assigned as an authorized speaker group user, is currently authorized and/or enabled to use the speaker group. Alternatively, or in addition, access control/user control attributes field 2224 may include a user level attribute 2224C. The user level attribute 2224C may be the same as or similar to a privilege level. For example, the user level attribute 2224C may hierarchically categorize users such that a user with a higher or greater level trumps a user with a lower level. Accordingly, if two users are attempting to stream audio content via the speaker group, the speaker group will cause the speakers within the group to play or otherwise output the audio content from the user with the higher user level.

The access control/user control attributes field 2224 may also include a parental control field 2224 D which may be enabled and/or disabled on a per user and/or per speaker group basis. For example, the parental control field 2224D may allow other users, or parents, the ability to control certain features associated with the speaker group. For instance, the parental control field 2224D, if enabled, may further control a maximum volume at which the speaker group may be played, include or otherwise identify the hours of the day in which the parental control features are active, and may additionally place restrictions on the type of audio content that may be played through the speakers associated with the speaker group. As another example, the parental control options may work in conjunction with a content rating system and may be set such that audio content from a user, or users, is not played or otherwise output from the speakers assigned to a speaker group if the rating of the audio content exceeds a predetermined threshold, such as an "explicit" rating. However, a user may be able to play explicit content using another speaker group or zone. For example, a first speaker group may not allow the playing of explicit content in a first location, but a second speaker group may allow explicit content.

The access control/user control attributes field 2224 may also allow for or otherwise provide for a "guest mode" of operation. For example, a guest mode provides the ability for a user to "take over" the speakers in a group from another user to play different content. For instance, if a user is listening to music with the content streaming from a mobile device 120, and another user wants to change the song to a song or other audio content originating from their phone, the wireless audio/video processing unit 112 and/or the speaker 604 may allow the guest user to take over the group based on user control settings in the access control/user control attributes field 2224. As another example, the "guest mode" would allow a friend who comes over to a user's home to take over a speaker group to play content, without having to be on the home network. For example, Wi-Fi direct may allow this functionality.

The first data structure 2204 may additionally include a reconfigurable attributes field 2228. The reconfigurable attributes field 2228 may include information that controls whether or not the speaker group, and/or the speakers within the group, may be reconfigured. For example, in instances where a first speaker group includes 8 speakers, the reconfigurable attributes field 2228 may specify whether or not any or all of the speakers may be included in another group. As previously discussed with respect to FIG. 11, a speaker group may share speakers; in some instances, it may not be ideal for speakers to be shared. Alternatively, or in addition, the reconfigurable attributes field 2228 may include a privilege level associated with a hierarchical importance of the speaker group. For example, in instances where a speaker group may share speakers with another speaker group, the speaker group having or otherwise assigned the higher privilege level will be provided access to the shared speakers before a speaker group with a lower privilege level. The first data structure 2204 may also include an other attributes field 2232, which may include other configurable and non-configurable attributes for the speaker group.

A second data structure 2208 may also be included. Such a data structure may be stored at each of the speakers, at the speaker 604, and/or at the wireless audio/video processor 112. The second data structure 2208 generally includes a speaker GUID field 2236 identifying the speaker, an availability field 2240 indicating whether or not the speaker is assignable to a group and/or whether a group is assignable to the speaker, and a group field 2244, indicating to which groups the speaker currently belongs. The second data structure 2208 may be consulted when determining whether or not a speaker is available for assignment.

A third data structure 2248 may also be included. The third data structure 2248 generally provides a mapping from a speaker configuration to one or more audio channels, such as in the field 2242. For instance, a first location 2252A, such as front left, may be mapped to an audio channel 1 and a second location 2242B, such as center, may be mapped to channel 2.

A fourth data structure 2256 may also be included. The fourth data structure 2256 generally provides a mapping of a speaker group 2260 (e.g. by a speaker group GUID) to the users/devices 2260A-B currently assigned to and/or streaming content to the speaker group. In addition, the fourth data structure 2256 associated with a speaker group may include a field 2260C indicating whether or not the speaker group is available for use.

Figure 23:
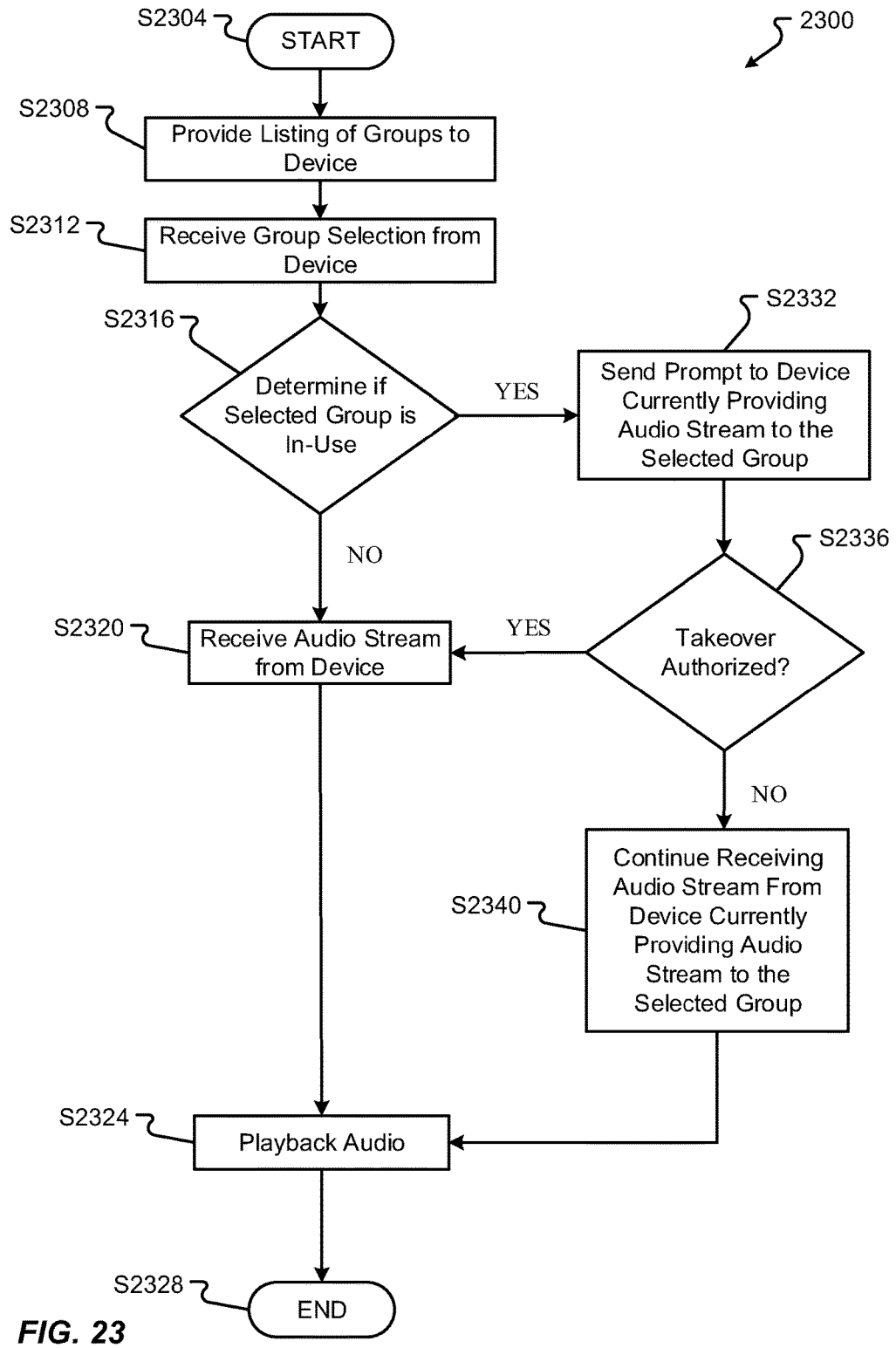
FIG. 23 is a ninth flow chart depicting details of at least one embodiment in accordance with embodiments of the present invention.

Referring now to FIG. 23, a method 2300 is displayed illustrating details of a speaker group selection and audio playback process in accordance with at least some embodiments of the present disclosure. Method 2300 is in embodiments, performed by one or more devices, such as a speaker 604, a wireless audio/video processing unit 112, and/or a mobile device 120. More specifically, one or more hardware and software components may be involved in performing method 2300. In one embodiment, one or more of the previously described units perform one or more of the steps of method 2300. The method 2300 may be executed as a set of computer-executable instructions executed by at least one of the speaker 604, the wireless audio/video processing unit 112, and/or the mobile device 120 and encoded or stored on a computer-readable medium. Hereinafter, the method 2300 shall be explained with reference to systems, components, units, software, etc. described with respect to FIGS. 1-22.

Method 2300 may continuously flow in a loop, flow according to a timed event, or flow according to a change in an operating or status parameter. Method 2300 may be initiated at step S2304 where a user wishes to play multimedia content, specifically audio content, to one or more speaker groups. More particularly, a device the user is using, such as a wireless audio/video processing unit 112 and/or a mobile device 120, may be used to request a list of available speaker groups. At step S2308, the speaker 604 and/or the wireless audio/video processing unit 112 may present, or cause to be presented, the list of available speaker groups to the user. For example, the speaker 604 and/or the wireless audio/video processing unit 112 may cause the list to be displayed on a television 116 and/or a display of the mobile device 120. Accordingly, at step S2312, a selection of a speaker group from the user may be received. The selection may be received at the speaker 604 and/or the wireless audio/video processing unit 112.

Once the selected group is received, the speaker 604 and/or the wireless audio/video processing unit 112 may determine whether or not the group is currently in-use and/or already assigned to a user at step S2316. For example, the speaker 604 and/or the wireless audio/video processing unit 112 may determine which user or device, if any, is currently using the speaker group utilizing the fourth data structure 2256. Accordingly, if the speaker group is not in use, the speaker 604 and/or the wireless audio/video processing unit 112 may assign the user and/or device to the group and proceed to receive an audio stream from the device in step S2320. At step S2324, the audio may be played by the selected speaker group and the method ends at step S2328.

Alternatively, or in addition, if the speaker group is in use, the speaker 604 and/or the wireless audio/video processing unit 112 may send a prompt to the user and/or the device currently providing the audio stream to the selected group at step S2332. For example, the speaker 604 and/or the wireless audio/video processing unit 112 may determine which device is currently streaming audio using the data structure 2256, and send a prompt to that device. At step S2336, if a takeover is authorized, according to the access control/user control attributes 2224 and/or in response to receiving an indication from the user/device currently streaming audio, the method 2300 may proceed to step S2320 where an audio stream is received from the device for playback. Alternatively, or in addition, if the takeover is not authorized, the audio stream already being received from the user/device will continue to be received at steps S2340. Method 2300 may also be implemented using a guest device in a manner consistent with that which has been described.

In accordance the present disclosure, embodiments of the present disclosure may be configured as follows:

(1) A method for generating a synchronized time value for a wireless speaker having a first timer and a second timer, the method including reading a first timer value associated with the first timer, wherein the first timer is synchronized with a wireless network, reading a first timer value associated with the second timer, and correlating the first timer value associated with the second timer to the first timer value associated with the first timer to generate the synchronized time value for the wireless speaker.

(2) The method of (1) above, further including generating a drift ratio based on the first timer value associated with the first timer, a second timer value associated with the first timer, the first timer value associated with the second timer, and a second timer value associated with the second timer, wherein the first timer value associated with the first timer is read subsequent to a reading of the second timer value associated with the first timer, and wherein the first timer value associated with the second timer is read subsequent to a reading of the second timer value associated with the second timer.

(3) The method of (2) above, wherein the synchronized time value for the wireless speaker is based on the drift ratio.

(4) The method according to any one of (1) to (3) above, wherein the first timer is a Time Synchronization Function (TSF) timer.

(5) The method according to any one of (1) to (3) above, wherein the first timer value is associated with a timing measurement (TIMINGMSMT) value.

(6) The method according to any one of (1) to (5) above, wherein at least one of the first timer and the second timer is a free running counter.

(7) The method according to any one of (1) to (6) above, wherein the first timer resides in a first speaker component and the second timer resides in a second speaker component.

(8) The method according to any one of (1) to (7) above, further including playing audio content based on the synchronized time value.

(9) A wireless speaker including a first timer, a second timer, one or more processors, and memory, wherein the memory contains one or more processor-executable instructions that when executed, cause the one or more processors to read a first timer value associated with a first timer, wherein the first timer is synchronized with a wireless network, read a first timer value associated with a second timer, and correlate the first timer value associated with the second timer to the first timer value associated with the first timer to generate a synchronized time value for the wireless speaker.

(10) The wireless speaker according to (9) above, wherein the one or more processor-executable instructions cause the one or more processors to generate a drift ratio based on the first timer value associated with the first timer, a second timer value associated with the first timer, the first timer value associated with the second timer, and a second timer value associated with the second timer, wherein the first timer value associated with the first timer is read subsequent to a reading of the second timer value associated with the first timer, and wherein the first timer value associated with the second timer is read subsequent to a reading of the second timer value associated with the second timer.

(11) The wireless speaker according to (1) above, wherein the one or more processor-executable instructions cause the one or more processors to generate the synchronized time value for the wireless speaker based on the drift ratio.

(12) The wireless speaker according to any one of (9) to (11) above, wherein the first timer is a Time Synchronization Function (TSF) timer.

(13) The wireless speaker according to any one of (9) to (11) above, wherein the first timer value is associated with a timing measurement (TIMINGMSMT) value.

(14) The wireless speaker according to any one of (9) to (13) above, wherein at least one of the first timer and the second timer is a free running counter.

(15) The wireless speaker according to any one of (9) to (14) above, wherein the first timer resides in a first speaker component and the second timer resides in a second speaker component.

(16) The wireless speaker according to any one of (9) to (15) above, wherein the one or more processor-executable instructions cause the one or more processors to play audio content based on the synchronized time value.

(17) A tangible computer-readable medium storing one or more instructions thereon, that when executed by one or more processors, cause the one or more processors to perform the method of any one of (1) to (8) above.

(18) A speaker comprising a speaker driver, one or more circuits configured to provide an audio signal to the speaker driver, an internal power supply including: a charge storage device configured to supply power to the one or more circuits, and a first charging coil configured to receive power from an electromagnetic field and charge the charge storage device, and a housing enclosing at least a portion of the speaker driver, the one or more circuits, and the charge storage device.

(19) The speaker according to (18) above, wherein the first charging coil is configured to receive power from a second charging coil located external to the first charging coil.

(20) The speaker according to any one of (18) to (19) above, wherein the first and second coils are tuned to resonate at the same frequency.

(21) The speaker according to any one of (18) to (19) above, wherein the second coil creates an alternating electromagnetic field.

(22). The speaker according to any one of (18) to (19) above, wherein the charge storage device is a battery.

(23) The speaker according to any one of (18) to (19) above, wherein the first charging coil is molded into a wall of the housing.

(24) The speaker according to (23) above, wherein the first charging coil is embedded in a floor of the housing.

(25) A system comprising a speaker driver, one or more circuits configured to provide an audio signal to the speaker driver, an internal power supply including: a charge storage device configured to supply power to the one or more circuits, and a first charging coil configured to receive power from an electromagnetic field and charge the charge storage device, a housing enclosing at least a portion of the speaker driver, the one or more circuits, and the charge storage device, and second charging coil located external to enclosure and being configured to provide power to the first charging coil.

(26) The system according to (25) above, wherein the first charging coil is configured to receive power from a second charging coil located external to the first charging coil.

(27) The system according to any one of (25) to (26) above, wherein the first and second coils are tuned to resonate at the same frequency.

(28) The speaker according to any one of (25) to (26) above, wherein the second coil creates an alternating electromagnetic field.

(29). The speaker according to any one of (25) to (28) above, wherein the charge storage device is a battery.

(30) The speaker according to any one of (25) to (29) above, wherein the first charging coil is molded into a wall of the housing.

(31) The speaker according to any one of (25) to (29) above, wherein the first charging coil is embedded in a floor of the housing.

(32) The system according to any one of (25) to (31) above, further including an external power source configured to provide power to the second charging coil.

(33) A speaker comprising: a speaker driver, one or more circuits configured to provide an audio signal to the speaker driver, an internal power supply including: a charge storage device configured to supply power to the one or more circuits, and a wireless power receiving device configured to wirelessly receive power and charge the charge storage device, and a housing enclosing at least a portion of the speaker driver, the one or more circuits, and the charge storage device.

(34) A method for maintaining speaker group information at a host device having a processor and memory, the method comprising: receiving a speaker group identifier from a first speaker, wherein the speaker group identifier identifies a speaker group having one or more speakers, and storing the speaker group identifier within the memory.

(35) The method according to (34) above, further including generating a second speaker group identifier, and providing the second speaker group identifier to the first speaker.

(36) The method according to (35) above, further including comprising: receiving a third speaker group identifier from the first speaker, and storing the second speaker group identifier within the memory.

(37) The method according to any one of (33) to (36) above, wherein the speaker group identifier identifies a speaker group that does not include the first speaker.

(38) The method according to any one of (33) to (37) above, further including receiving a globally unique speaker identifier from the first speaker, and storing the globally unique speaker identifier within the memory.

(39) The method according to (38) above, wherein the globally unique speaker identifier identifies a second speaker.

(40) The method according to any one of (33) to (39) above, further including receiving location information for the first speaker, and storing the location information within the memory.

41. The method according to any one of (33) to (40) above, further including receiving location information for a speaker other than the first speaker from the first speaker, and storing the location information within the memory.

(42) The method according to any one of (33) to (41) above, further including establishing a secure connection between the host device and the first speaker.

(43) A method for maintaining speaker group information at a first speaker having a processor and memory, the method comprising receiving a first speaker group identifier from a first host device, wherein the first speaker group identifier identifies a speaker group having one or more speakers, and storing the first speaker group identifier within the memory.

(44) The method according to (43) above, further including receiving a second speaker group identifier from a second host device, wherein the second speaker group identifier identifies a speaker group having one or more speakers, and storing the second speaker group identifier within the memory.

(45) The method according to (44) above, wherein at least one of the first and second speaker group identifiers identify a speaker group that does not include the first speaker.

(46) The method according to any one of (43) to (45) above, further including receiving a globally unique speaker identifier from the first host device, and storing the globally unique speaker identifier within the memory of the first speaker.

(47) The method according to (46) above, wherein the globally unique speaker identifier identifies a second speaker.

(48) The method according to any one of (43) to (47) above, further including receiving location information for the first speaker, and storing the location information within the memory.

(49) The method according to any one of (44) to (48) above, further including receiving location information for a speaker other than the first speaker from at least one of the first and second host devices, and storing the location information within the memory of the first speaker.

(50) The method according to any one of (43) to (49) above, further including establishing a secure connection between the first host device and the first speaker.

(51) The method according to any one of (34) to (50) above, wherein the host device is an audio/video processor.

(52) The method according to (51) above, wherein the audio/video processor wirelessly connects to one or more speakers.

(53) A wireless speaker comprising one or more processors, and memory, wherein the memory contains one or more processor-executable instructions that when executed, cause the one or more processors to perform the method of any one of (34) to (52) above.

(54) A tangible computer-readable medium storing one or more instructions thereon, that when executed by one or more processors, cause the one or more processors to perform the method of any one of (34) to (52) above.

(55) A method for selecting a speaker group for audio playback, the method comprising: requesting a listing of speaker groups, receiving a selection of at least one of the speaker groups, and causing audio to be played by the selected at least one speaker group.

(56) The method according to (55) above, further including determining whether the selected at least one speaker groups is in-use.

(57) The method according to (56) above, wherein the selected at least one speaker group is in-use if audio is being played by the selected at least one speaker group.

(58) The method according to any one of (55) to (57) above, wherein the selected at least one speaker group is in-use if audio is being played by at least one speaker of the selected at least one speaker group.

(59) The method according to any one of (55) to (58) above, wherein the selected at least one speaker group is in-use if the selected at least one speaker group is assigned to a user.

(60) The method according to any one of (55) to (59) above, wherein the selected at least one speaker group is in-use if at least one speaker of the selected at least one speaker group is assigned to a user.

(61) The method according to any one of (55) to (60) above, further including causing to be displayed at a display device, the listing of available speaker groups.

(62) The method according to any one of (54) to (61) above, further including causing a prompt to be displayed to a display device currently providing audio content to at least one speaker group of the listing of speaker groups.

(63) The method according to any one of (55) to (61) above, further including causing a prompt to be displayed to a display device currently providing audio content to the selected at least one speaker group.

(64) The method according to any one of (62) to (63) above, further including receiving an indication indicating whether or not a speaker group takeover is authorized for the selected at least one speaker group.

(65) The method according to (64) above, wherein if a speaker group takeover is authorized, the selected at least one speaker group is assigned to at least one of a user, a device other than a user, or a device currently providing audio content to the selected at least one speaker group.

(66) A wireless speaker comprising: one or more processors, and memory, wherein the memory contains one or more processor-executable instructions that when executed, cause the one or more processors to perform the method of any one of (55) to (65) above.

(67) A tangible computer-readable medium storing one or more instructions thereon, that when executed by one or more processors, cause the one or more processors to perform the method of any one of (55) to (65) above.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for maintaining speaker group information at a host device having a processor and memory, the method comprising:
   receiving a first speaker group identifier from a first speaker, wherein the first speaker group identifier identifies a speaker group having one or more speakers;
   storing the first speaker group identifier within the memory;
   generating a second speaker group identifier;
   providing the second speaker group identifier to the first speaker;
   receiving a third speaker group identifier from the first speaker; and
   storing the third speaker group identifier within the memory.

2. The method according to claim 1, wherein the first speaker group does not include the first speaker.

3. The method according to claim 1, further comprising:
   receiving a globally unique speaker identifier from the first speaker; and
   storing the globally unique speaker identifier within the memory.

4. The method according to claim 3, wherein the globally unique speaker identifier identifies a second speaker.

5. The method according to claim 1, further comprising:
   receiving location information for the first speaker; and
   storing the location information within the memory.

6. The method according to claim 1, further comprising:
   receiving location information from the first speaker for a speaker other than the first speaker; and storing the location information within the memory.

7. The method according to claim 1, further including comprising:
   establishing a secure connection between the host device and the first speaker.

8. A computer-readable device storing one or more instructions thereon, that when executed by one or more processors, cause the one or more processors to perform the method of claim 1.

9. A method for maintaining speaker group information at a first speaker having a processor and memory, the method comprising:
   receiving a first speaker group identifier from a first host device, wherein the first speaker group identifier identifies a first speaker group having one or more speakers;
   storing the first speaker group identifier within the memory;
   receiving a second speaker group identifier from a second host device, wherein the second speaker group identifier identifies a second speaker group having one or more speakers; and
   storing the second speaker group identifier within the memory,
   wherein at least one of the first speaker group identifier or the second speaker group identifier identifies a speaker group that does not include the first speaker.

10. The method according to claim 9, further comprising:
    receiving a globally unique speaker identifier from the first host device; and
    storing the globally unique speaker identifier within the memory of the first speaker.

11. The method according to claim 10, wherein the globally unique speaker identifier identifies a second speaker.

12. The method according to claim 9, further comprising:
    receiving location information for the first speaker; and
    storing the location information within the memory.

13. The method according to claim 9, further comprising:
    receiving location information for a speaker other than the first speaker from at least one of the first and second host devices; and
    storing the location information within the memory of the first speaker.

14. The method according to claim 9, further comprising:
    establishing a secure connection between the first host device and the first speaker.

15. A computer-readable device storing one or more instructions thereon, that when executed by one or more processors, cause the one or more processors to perform the method of claim 9.

16. A first speaker comprising:
    one or more processors; and
    memory including one or more processor-executable instructions, that when executed, cause the one or more processors to:
    receive a first speaker group identifier from a first host device, wherein the first speaker group identifier identifies a first speaker group having one or more speakers;
    store the first speaker group identifier within the memory;

receive a second speaker group identifier from a second host device, wherein the second speaker group identifier identifies a second speaker group having one or more speakers; and store the second speaker group identifier within the memory, wherein at least one of the first speaker group identifier or the second speaker group identifier identifies a speaker group that does not include the first speaker.

17. The first speaker of claim 16, wherein the one or more processor-executable instructions cause the one or more processors to:

receive a globally unique speaker identifier from the first host device; and store the globally unique speaker identifier within the memory.

18. The first speaker of claim 16, wherein the globally unique speaker identifier identifies a second speaker.

19. The first speaker of claim 16, wherein the one or more processor-executable instructions cause the one or more processors to:

receive location information for the first speaker, and store the location information within the memory.

20. The first speaker of claim 16, wherein the one or more processor-executable instructions cause the one or more processors to:

receive location information for a speaker other than the first speaker from at least one of the first and second host devices; and store the location information within the memory.

* * * * *